United States Patent [19]
Tzelnic et al.

[11] Patent Number: 5,944,789
[45] Date of Patent: Aug. 31, 1999

[54] NETWORK FILE SERVER MAINTAINING LOCAL CACHES OF FILE DIRECTORY INFORMATION IN DATA MOVER COMPUTERS

[75] Inventors: Percy Tzelnic, Concord; Uresh K Vahalia, Newton, both of Mass.

[73] Assignee: EMC Corporation, Hopkinton, Mass.

[21] Appl. No.: 08/748,363

[22] Filed: Nov. 13, 1996

Related U.S. Application Data

[60] Provisional application No. 60/023,914, Aug. 14, 1996.

[51] Int. Cl.[6] .................................................. G06F 15/163
[52] U.S. Cl. .......................... 709/214; 711/145; 711/118; 707/8; 707/7
[58] Field of Search ........................ 395/200.08, 200.09, 395/200.66, 200.44, 726, 730, 650, 425, 800; 707/7, 8; 709/214; 711/145, 118

[56] References Cited

U.S. PATENT DOCUMENTS

| | | | |
|---|---|---|---|
| 5,175,852 | 12/1992 | Johnson et al. | 395/707 |
| 5,218,695 | 6/1993 | Noveck et al. | 395/600 |
| 5,226,143 | 7/1993 | Baird et al. | 395/711 |
| 5,226,159 | 7/1993 | Henson et al. | 395/707 |
| 5,276,860 | 1/1994 | Fortier et al. | 395/575 |
| 5,276,867 | 1/1994 | Kenley et al. | 395/600 |
| 5,367,698 | 11/1994 | Webber et al. | 395/800 |
| 5,442,749 | 8/1995 | Northcutt et al. | 395/200.09 |
| 5,504,873 | 4/1996 | Martin et al. | 395/438 |
| 5,519,435 | 5/1996 | Anderson | 348/8 |
| 5,550,982 | 8/1996 | Long et al. | 395/200.13 |
| 5,551,025 | 8/1996 | O'Reilly et al. | 395/600 |
| 5,574,662 | 11/1996 | Windrem et al. | 364/514 R |
| 5,583,561 | 12/1996 | Baker et al. | 348/7 |
| 5,590,320 | 12/1996 | Maxey | 395/619 |
| 5,610,653 | 3/1997 | Abecassis | 348/110 |
| 5,625,405 | 4/1997 | DuLac et al. | 348/7 |
| 5,633,810 | 5/1997 | Mandal et al. | 364/514 C |
| 5,633,999 | 5/1997 | Clowes et al. | 395/182.04 |
| 5,737,747 | 4/1998 | Vishlitzky et al. | 395/711 |
| 5,829,046 | 10/1998 | Tzelnic et al. | 711/162 |

OTHER PUBLICATIONS

Hastings R, "The shark continuous–media file server," Proceedings IEEE COMPCON 93, San Francisco, Calif., 1993, pp. 12–15.

Little TD, Rhanger G, Folz RJ, Gibbon JF, Reeve FW, Schelleng DH, Venkatesh D, "A digital on–demand video service supporting content based queries," Proceedings of ACM Multimedia 93, Anaheim, Calif., Aug. 1–6, 1993, pp. 427–436.

(List continued on next page.)

*Primary Examiner*—Dung C. Dinh
*Assistant Examiner*—Hieu C. Le
*Attorney, Agent, or Firm*—Arnold White & Durkee

[57] ABSTRACT

A network file server includes an integrated cached disk array and a plurality of data mover computers linking the cached disk array to the data network for file access. Each data mover computer maintains a local cache of file directory information including locking information of locked files that are accessible through the data mover. A cache consistency scheme ensures that shared locking information is consistent in the local caches. In a preferred embodiment, the cache consistency scheme uses an internal data link to pass messages between the data movers. The file directory information in the local cache includes information mapping file names to a list of logical blocks for each file name, file attributes that affect data access, and locking information down to a block level of granularity. Each data mover computer has network file manager software that maintains client ownership of locked files and communicates with the clients, and data mover file manager software that manages data mover computer ownership of locked files and communicates with other data mover computers. The cache consistency messages indicate a grant of data mover ownership over a file, a release of data mover ownership over a file, a denial of a request for access to a locked file, and changes to file attributes affecting access to a file. The local caches and the cache consistency scheme eliminate any need to store file locking information in the cached disk array.

45 Claims, 20 Drawing Sheets

OTHER PUBLICATIONS

Lougher, P, Sheperd, D. "The design of a storage server for continuous media," The Computer Journal, vol. 36, No. 1, 1993, pp. 32–42.

Rangan PV, Vin HM, Ramanathan S, "Designing an on–demand multimedia service," IEEE Communications Magazine, vol. 30, No. 7, Jul. 1992, pp. 56–64.

Sincoskie, WD, "System architecture for a large scale video on demand service," Computer Networks and ISDN Systems, vol. 22, No. 2, Sep. 1991, pp. 155–162.

Tobagi FA, Pang J, "StarWorks (Trademark)—A video applications server," Proceedings, IEEE COMPCON 93, San Francisco, Calif., 1993, pp. 4–11.

Vaitzblit L, "The design and implementation of a high band–width file service for continuous media," Master's Thesis, Massachusetts Institute of Technology, Cambridge, Mass., Nov. 4, 1991.

Rangen PV, Vin HM, "Designing file systems for digital audio and video," Proceedings of the 13th ACM Symposium on Operating Systems Principles, Monterey, Calif., 1991, pp. 81–94.

Vin HM, Rangan PV, (1993), "Designing a multiuser HDTV storage server," IEEE Journal on Selected Areas in Communication, vol. 11, No. 1, Jan. 1993, pp. 153–164.

Anderson DP, Osawa Y, Govindan R, "A file system for continuous media," ACM Transactions on Computer Systems, vol. 10., No. 4, Nov. 1992, pp. 311–337.

Federighi C, "A Distributed Hierarchical Storage Manager for a Video–on–Demand System," Department of Electrical Engr. and Computer Science, University of California, Berkeley, California, Dec. 1993.

NETWORK FILE SERVER MAINTAINING LOCAL CACHES OF FILE DIRECTORY INFORMATION IN DATA MOVER COMPUTERS

RELATED APPLICATIONS

The present application is a continuation-in-part of provisional application Ser. No. 60/023,914 filed Aug. 14, 1996, incorporated herein by reference, and which has the following continuation-in-part applications: Percy Tzelnic et al., Ser. No. 08/747,875 filed Nov. 13, 1996 (pending), entitled "Network File Server Using an Integrated Cached Disk Array and Data Mover Computers"; Uresh K. Vahalia et al., Ser. No. 08/748,363 filed Nov. 13, 1996 (pending), entitled "File Server Having a File System Cache and Protocol for Truly Safe Asynchronous Writes"; and Uresh K. Vahalia et al., Ser. No. 08/747,769 filed Nov. 13, 1996 (pending), entitled "Network File Server Having a Message Collector Queue for Connection Oriented Protocols." Percy Tzelnic et al., Ser. No. 08/747,875 filed Nov. 13, 1996 (pending), entitled "Network File Server Using an Integrated Cached Disk Array and Data Mover Computers," is a continuation-in-part of provisional application Ser. No. 60/005,988 filed Oct. 27, 1995 by Percy Tzelnic et al., entitled "Video File Server," incorporated herein by reference, and its pending divisional applications: Percy Tzelnic et al., Ser. No. 08/661,152 filed Jun. 10, 1996, entitled "Video File Server Using an Integrated Cached Disk Array and Stream Server Computers; Natan Vishlitzky et al., U.S. Pat. No. 5,737,749 filed Jun. 10, 1996, entitled "Prefetching to Service Multiple Video Streams from an Integrated Cached Disk Array"; Uresh Vahalia et al., Ser. No. 08/661,053 filed Jun. 10, 1996, entitled "Staggered Stream Support for Video On Demand"; and Percy Tzelnic et al., U.S. Pat. No. 5,829,046 filed Jun. 10, 1996, entitled "On-Line Tape Backup Using an Integrated Cached Disk Array", which are all incorporated herein by reference.

BACKGROUND OF THE INVENTION

1. Field of the Invention

The present invention relates generally to data storage subsystems, and more particularly to cached disk arrays. The invention specifically relates to network file servers.

2. Background Art

Mainframe data processing, and more recently distributed computing, have required increasingly large amounts of data storage. This data storage is most economically provided by an array of low-cost disk drives integrated with a large semiconductor cache memory. Such integrated cached disk arrays were originally introduced for use with IBM compatible host computers. A channel director in the integrated cached disk array executed channel commands received over a channel from the host computer. More recently, a network attachment has been proposed for interfacing the integrated cached disk array to a network. The network attachment, for example, is a computer programmed to communicate with clients on a network by following a network communication protocol, and to communicate with the integrated cached disk array by issuing channel commands. Although this approach has the advantage of using a conventional integrated cached disk array, the capabilities of the integrated cached disk array are under utilized in this configuration, because the network attachment is a bottleneck to data access.

SUMMARY OF THE INVENTION

In accordance with a basic aspect of the invention, there is provided a network file server for serving clients in a data network. The network file server includes an integrated cached disk array storage subsystem and a plurality of data mover computers linking the cached disk array to the data network for the transfer of data between the cached disk array and the network. The network file server maintains a file directory accessible by the data mover computers in response to file access requests to determine whether or not file access for a client is permitted. In particular, each of the data mover computers maintains a local cache of file directory information including locking information of locked files that are accessible through the data mover.

In accordance with another aspect of the invention, the cached disk array stores files accessible by the clients through more than one of the data mover computers. A cache consistency scheme ensures that shared locking information is consistent in the caches of the data movers. Therefore, each data mover computer can access its local cache to determine whether or not file access for a client is permitted, without accessing file directory information stored in the cached disk array. This local caching of shared file directory information substantially reduces loading on the cached disk array.

In a preferred embodiment, the cache consistency scheme uses an internal data link to pass messages between the data movers. As a result of this message passing, each data mover maintains a list or index of the files or portions thereof that are currently locked. The file directory information in the local cache includes mapping information mapping file names to a list of logical blocks for each file name, file attributes that affect data access, and locking information down to a block level of granularity. The local cache includes the file information affecting file access for all locked files accessible through the data mover, and also includes a partial directory of file information for unlocked files. For example, when a file becomes unlocked, the file information is kept in the local cache until cache memory is needed for caching file information for another file being accessed. File system software for managing the file directory is replicated in each data mover computer.

In a preferred construction of the file system software, file manager software in each data mover computer includes network file manager software that recognizes clients that access files but not different data movers, and data mover file manager software that recognizes different data mover computers but not the clients that access files. The network manager software communicates with network clients requesting file access, and maintains client ownership information for the files accessible through the data mover computer. The data mover file manager software manages the passing of cache consistency messages over the internal data link among the data mover computers, and maintains data mover ownership for the files accessible through the data mover computer.

The cache consistency messages, for example, indicate a grant of data mover ownership over a file, a release of data mover ownership over a file, a denial of a request for access to a locked file, and changes to file attributes affecting access to a file. The messages indicating grant and release of data mover ownership are used to update the data mover ownership information in the local file directories. The messages indicating denial of a request for access to a locked file are used to maintain a local wait list for each locked file when data movers are waiting for a lock to be released. A message indicating denial of a request for access to a locked file, however, need be transmitted only when the data mover computer denying a client request would not already be the next data mover computer waiting for release of a lock on the file.

BRIEF DESCRIPTION OF THE DRAWINGS

Other objects and advantages of the invention will become apparent upon reading the following detailed description with reference to the accompanying drawings wherein.

Figure 1:
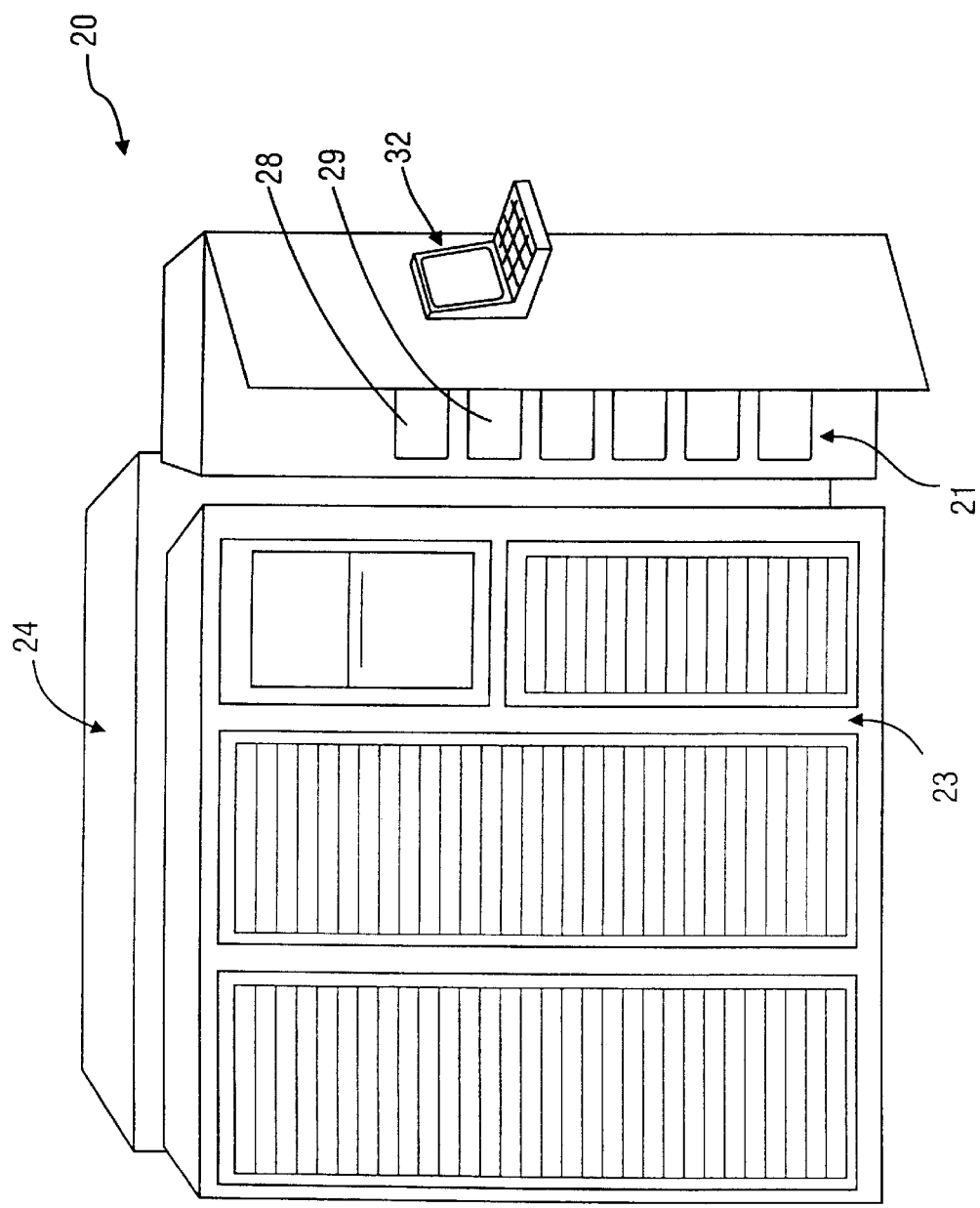
FIG. 1 is a perspective view of a network file server that incorporates the present invention.

While the invention is susceptible to various modifications and alternative forms, specific embodiments thereof have been shown in the drawings and will be described in detail. It should be understood, however, that it is not intended to limit the invention to the particular forms shown, but to the contrary, the intention is to cover all modifications, equivalents, and alternatives falling within the scope of the invention as defined by the appended claims.

DETAILED DESCRIPTION OF THE PREFERRED EMBODIMENTS

I. The Architecture of a Network File Server

Turning now to FIG. 1 of the drawings, there is shown a network file server generally designated 20 incorporating the present invention. The network file server 20 includes an array of data movers 21, a network server display and keyboard 32, an integrated cached disk array storage subsystem (cached disk array) 23, and an optional tape silo 24. At least two of the data movers 28, 29 are also programmed to service the network server display and keyboard 32, and these particular data movers will be referred to as display and keyboard servers. However, at any given time, only one of the display and keyboard servers 28, 29 is active in servicing the network server display and keyboard 32.

The network file server 20 is managed as a dedicated network appliance, integrated with popular network operating systems in a way, which, other than its superior performance, is transparent to the end user. It can also be provided with specialized support for isochronous data streams used in live, as well as store-and-forward, audio-visual applications, as described in the above-referenced Percy Tzelnic et al. provisional application Ser. No. 60/005, 988 entitled "Video File Server," and its divisional applications: Percy Tzelnic et al., Ser. No. 08/661,152 filed Jun. 10, 1996, entitled "Video File Server Using an Integrated Cached Disk Array and Stream Server Computers; Natan Vishlitzky et al., Ser. No. 08/661,185 filed Jun. 10, 1996, entitled "Prefetching to Service Multiple Video Streams from an Integrated Cached Disk Array"; Uresh Vahalia et al., Ser. No. 08/661,053 filed Jun. 10, 1996, entitled "Staggered Stream Support for Video On Demand"; and Percy Tzelnic et al., Ser. No. 08/661,187 filed Jun. 10, 1996, entitled "On-Line Tape Backup Using an Integrated Cached Disk Array;" which are all incorporated herein by reference.

The network file server 20 is directed to high-end file server applications such as the Network File System (NFS, version 2 and 3) (and/or other access protocols). NFS is a well-known IETF file access protocol standard (RFC 1094, Sun Microsystems, Inc., "NFS: Network File System Protocol Specification," Mar. 1, 1989). NFS acts as a network server for network communications by providing basic file access operations for network clients. Such basic file access operations include opening a file, reading a file, writing to a file, and closing a file.

The clustering of the data movers 21 as a front end to the integrated cached disk array 23 provides parallelism and scalability. The clustering of random-access memory in the data movers 21 also supplements the cache resources of the cached disk array 23, as will be further described below.

Each of the data movers 21, including the display and keyboard servers 28, 29, is a high-end commodity computer, providing the highest performance appropriate for a data mover at the lowest cost. The data movers 21 are mounted in a standard 19" wide rack. Each of the data movers 21, for example, includes and Intel processor connected to a EISA or PCI bus and at least 64 MB of random-access memory. The number of the data movers 21, their processor class (i486, Pentium, etc.) and the amount of random-access memory in each of the data movers, are selected for desired performance and capacity characteristics, such as the number of concurrent network clients to be serviced. Preferably, one or more of the data movers 21 are kept in a standby mode, to be used as "hot spares" or replacements for any one of the other data movers that fails to acknowledge commands from the other data movers or is otherwise found to experience a failure.

Each of the data movers 21 contains one or more high-performance FWD (fast, wide, differential) SCSI connections to the cached disk array 23. Each of the data movers 21 may also contain one or more SCSI connections to the optional tape silo 24. Each of the data movers 21 also contains one or more bidirectional network attachments 30 configured on the data mover's EISA or PCI bus. The network attachments 30, for example, are Ethernet, FDDI, ATM, DS1, DS3, or channelized T3 attachments to data links to a network (25 in FIG. 2). The network 25 connects these network attachments to the network clients 54, for example, through an ATM switch 53. Each of the data movers 21 also includes an additional Ethernet connection to an internal dual-redundant Ethernet link (26 in FIG. 2) for coordination of the data movers with each other, including the display and keyboard servers 28, 29.

The display and keyboard server 28, 29 active for servicing of the display and keyboard 32 can also conduct one or more standard management and control protocols such as SNMP (RFC 1157, M. Schoffstall, M. Fedor, J. Davin, J. Case, "A Simple Network Management Protocol (SNMP)," May 10, 1990). SNMP is an internet protocol that permits inspection and modification of system variables such as the network address (IP) and the number of buffers for network communication. In addition to the connections described above that the data movers 21 have to the network 25, the cached disk array 23, and the optional tape silo 24, each of the display and keyboard servers 28, 29 also has a connection to a serial link 31 to the network server display and keyboard 32. The display and keyboard servers 28, 29 run a conventional operating system (such as Windows NT or UNIX) to provide a hot-failover redundant configuration for servicing of the display and keyboard 32. An operator at the display and keyboard 32 uses SNMP for management and control of the resources of the network file server 20.

The integrated cached disk array 23 is configured for an open systems network environment. Preferably the cached disk array 23 is a Symmetrix 5500™ ICDA™ cached disk array manufactured by EMC Corporation, 171 South Street, Hopkinton, Mass., 01748-9103.

Figure 2:
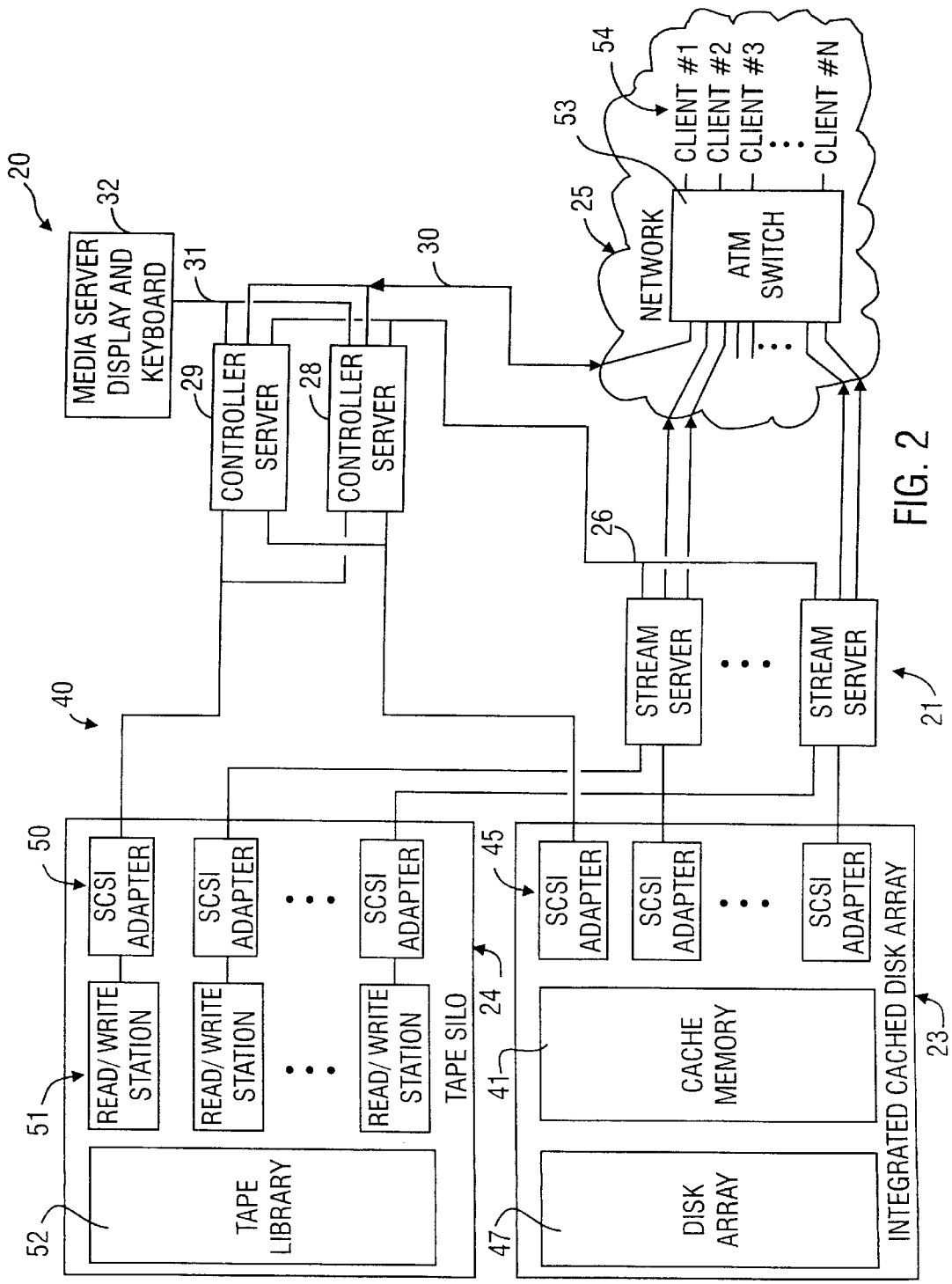
FIG. 2 is a block diagram of the network file server of FIG. 1 and its connections to a network.

Turning now to FIG. 2, there is shown a block diagram of the network file server 20 including the SCSI connections 40 among the cached disk array 23, the optional tape silo 24, the controller servers 28, 29, and the data movers 21. The cached disk array 23 includes a large capacity semiconductor cache memory 41 and SCSI adapters 45 providing one or more FWD SCSI links to each of the data movers 21, including the display and keyboard servers 28, 29.

The optional tape silo 24 includes an array of SCSI adapters 50 and an array of read/write stations 51. Each of the read/write stations 51 is connected via a respective one of the SCSI adapters 50 and a FWD SCSI link to a respective one of the data movers 21, including the display and keyboard servers 28, 29. The read/write stations 51 are controlled robotically in response to commands from the data movers 21 for tape transport functions, and preferably also for mounting and unmounting of tape cartridges into the read/write stations from storage bins.

In a preferred mode of operation, to archive data from a file from the network to tape, one of the data movers 21 receives the file from the network 25 and prestages the file to the cached disk array 23 at a high rate limited by the network transmission rate (about 150 GB/hour). Then one of the data movers 21 destages the file from the cached disk array 23 to an associated one of the read/write stations 51 at a tape device speed (about 7 GB/hour). For most applications, prestaging to disk can be done immediately, and staging from disk to tape including sorting of files onto respective tape cassettes can be done as a background operation or at night, when the load on the network file server 20 is at a minimum. In this fashion, the cached disk array 23 can absorb a high data inflow aggregation from tens or hundreds of network links streaming from multiple sites, and balance this load on the read/write stations 41. Prestaging to the integrated cached disk array allows better use of the read/write stations 51, matching of server flow to tape streaming flow, and reduction of tape and read/write station wear. Prestaging to the back-end also allows multiple classes of backup and restore services, including instant backup for files maintained on disk in the cached disk array 23, and temporary batch backup pending a success or failure acknowledgment. Prestaging to the cached disk array 23 also makes economical an on-line archive service performing the staging from the cached disk array 23 to tape as a background process.

Figure 3:
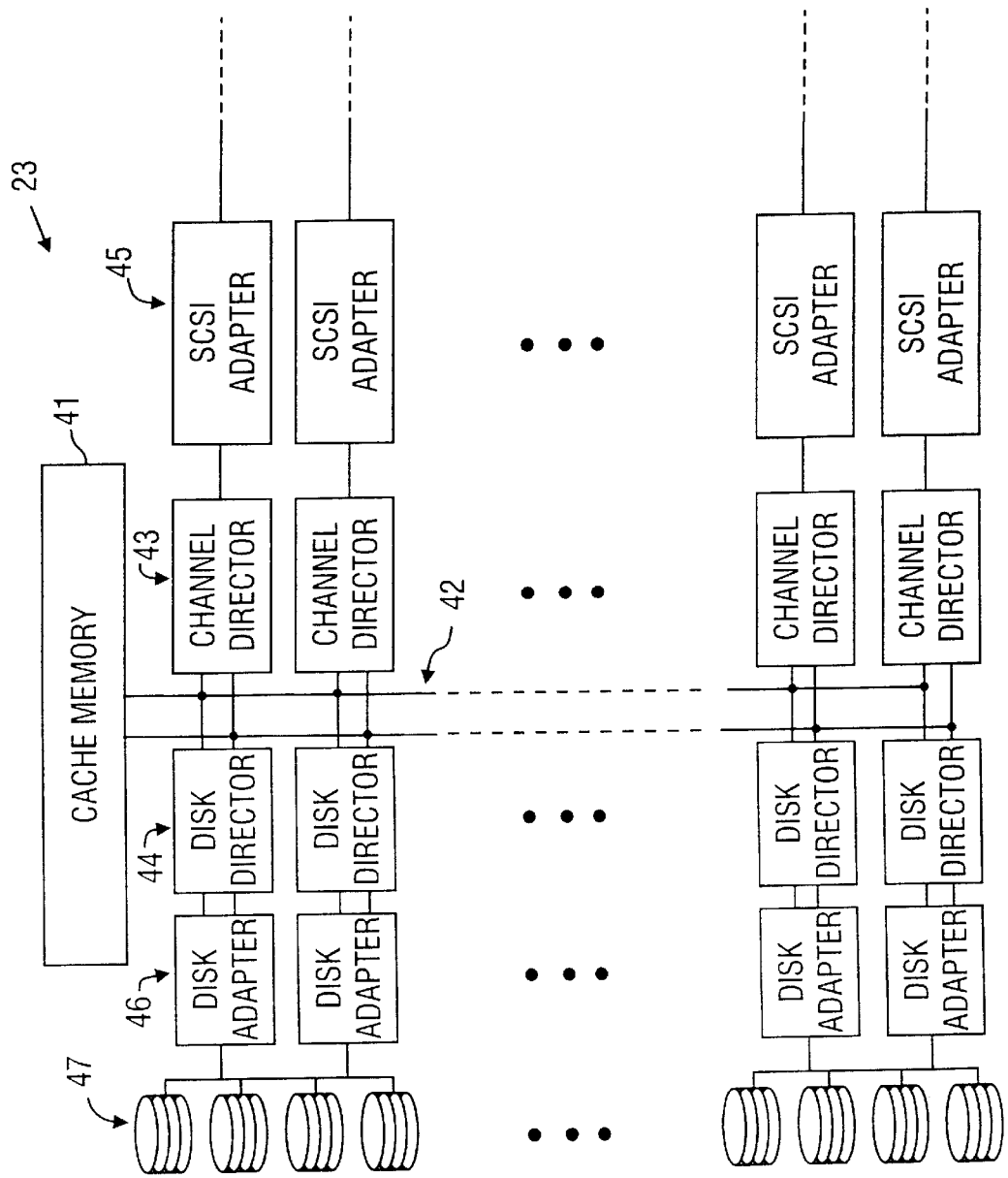
FIG. 3 is a block diagram of an integrated cached disk array storage subsystem used in the network file server of FIG. 1.

Turning now to FIG. 3, there is shown a more detailed block diagram of the integrated cached disk array 23. The cache memory 41 is composed of dynamic RAM cards mating with a dual redundant back-plane system bus 42. The cached disk array 23 also includes micro-processor cards that mate with the back-plane system bus 42 and are programmed to function as channel directors 43 or disk directors 44. Each of the channel directors 43 is interfaced through one of a number of SCSI adapters 45 to the SCSI interface of one of the data movers 21. Each of the disk directors 44 is interfaced through at least one of a number of disk adapters 46 connected to a string of commodity FBA (fixed-block architecture) disk drives 47. The channel directors 43 access data in the cache memory 41 in response to a request from its associated data mover. If data to be read by a channel director is not found in cache memory, one of the disk directors 44 and disk adapters 46 transfers or "stages" the data from the disk array 47 to the cache memory 41. In a background process, the disk directors 44 and disk adapters 46 also write-back data from the cache memory 41 to the disk array 47, after the channel directors write data to the cache memory 41. In addition to providing intermediate storage for the data transferred between the channel directors 43 and the disk directors 44, the cache memory 41 also provides intermediate storage for control information transferred among the channel directors and disk directors.

The bus 42 is preferably the back-plane of a printed-circuit card-cage or main-frame in the cached disk array 23, and each of the channel directors 43 and disk directors 44 is constructed on a printed circuit board that is mounted in the card-cage or main-frame. The channel director and disk director boards are further described in Yanai et al. U.S. Pat. No. 5,335,352, issued Aug. 2, 1994, and entitled Reconfigurable, Multi-Function Disc Controller, incorporated herein by reference. The cache memory 41 is constructed on a number of additional printed circuit boards that are mounted in the card-cage or main-frame. Further details regarding the construction and operation of the cached disk array 23 are disclosed in Yanai et al., U.S. Pat. No. 5,206,939, issued Apr. 27, 1993; and Yanai et al. U.S. Pat. No. 5,381,539, issued Jan. 10, 1995; all incorporated herein by reference.

II. Network File Server Software

Figure 4:
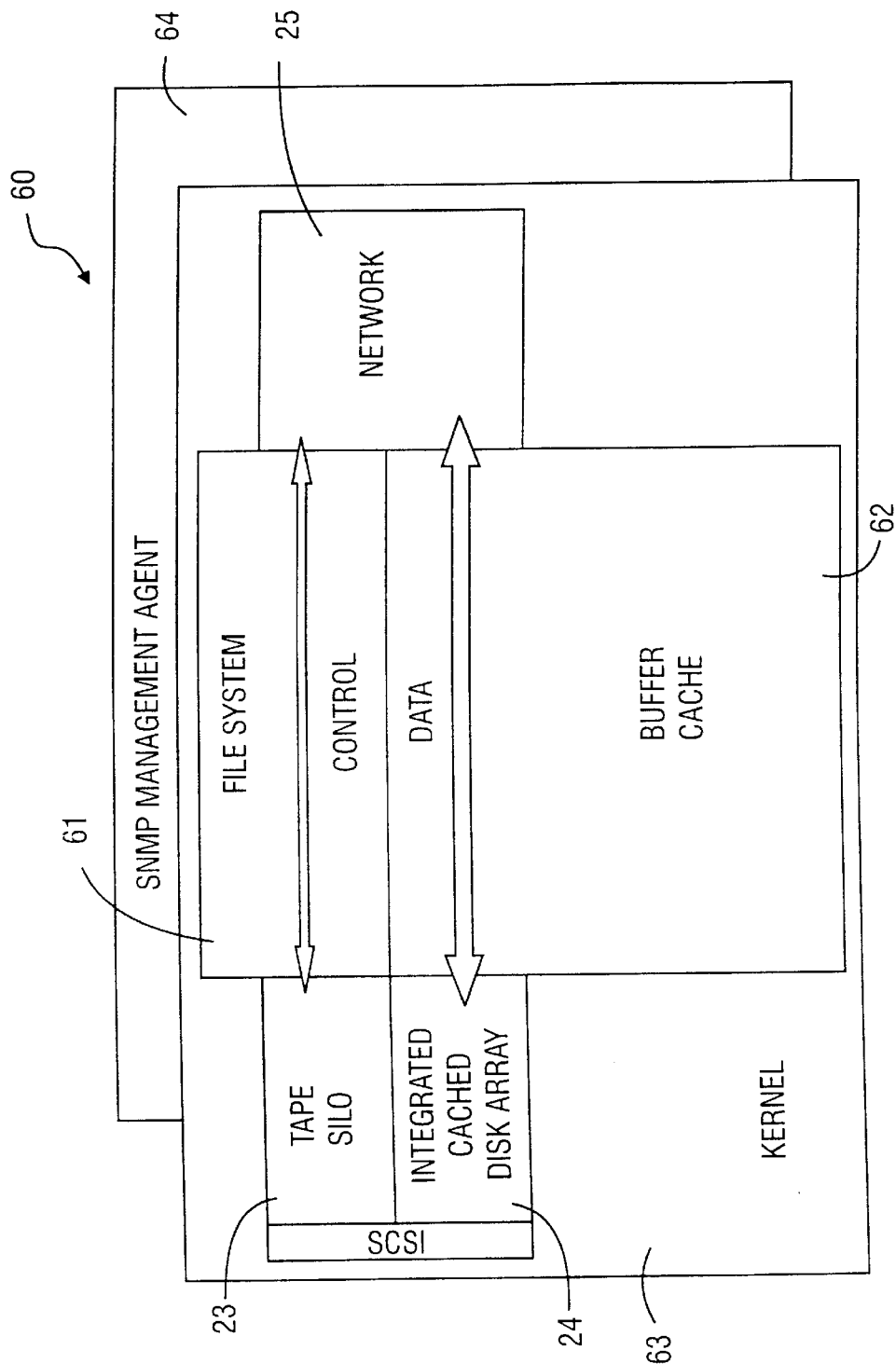
FIG. 4 is a block diagram showing software structure in the network file server of FIG. 1.

Turning now to FIG. 4, there is shown a block diagram of software 60 providing a real-time processing environment in the network file server (20 of FIGS. 1 and 2). The software 60 is executed by the processors of the data movers 21, including the display and keyboard servers 28, 29. The software 60 also provides an environment for managing file services and multiple high-performance data streams as well as a standard set of service-level application program interfaces (APIs) for developing and porting file service protocols (such as NFS). The software 60 is an application run by a general purpose operating system such as Microsoft NT.

The software 60 includes a file system 61 for controlling transfer of data between the network 25 and the cached disk array (23 in FIGS. 1 and 2) or the optional tape silo (24 in FIGS. 1 and 2). A buffer cache 62 composed of part of the random-access memory of the data movers 21 is used as a buffer for this data transfer.

The software 60 also includes a kernel program 63 providing a real-time scheduler. The kernel program 63 separates control information (file access and synchronization protocols) from the underlying data stream.

The software 60 further includes an SNMP management agent 64 supporting a Simple Network Management Protocol. SNMP is a standard internet protocol for inspecting and changing system variables. For example, the SNMP management agent is used when an operator at the network server display and keyboard (32 in FIG. 1) sets the network IP address of the network file server (20 in FIG. 1).

Figure 5:
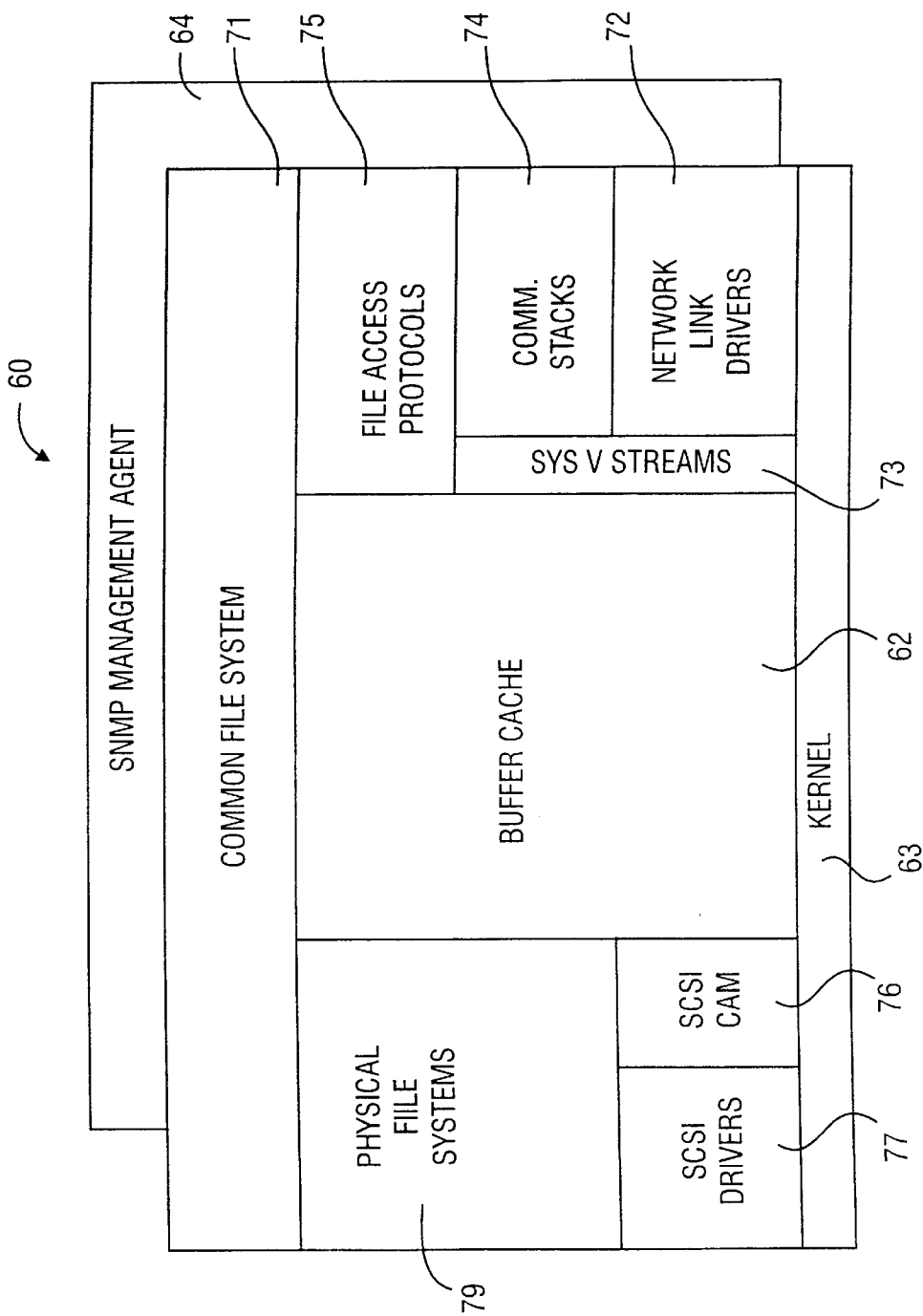
FIG. 5 is a more detailed block diagram showing various modules of the software structure of FIG. 4.

Turning now to FIG. 5, there is shown a more detailed block diagram of the software structure 60 in each data mover. The file system 61 in FIG. 4 has been expanded into its components. These components are a common file system 71, a group of software modules providing communication between the common file system and the network, and a group of software modules providing communication between the common file system and the integrated cached disk array 23 or the optional tape silo 24. The common file system 71 uses the Virtual File System (VFS), which is an industry-standard back-end file system switch, to interface with the physical file systems 79. VFS translates NFS Common File System requests. (The NFS Common File System Requests in themselves are translations of NFS requests to the intended physical file storage devices. NFS is one of the file access protocols 75.) The common file system 71 accesses the buffer cache 62 during data transfers between the network (25) and disk or tape storage (23, 24).

The group of software modules providing communication between the common file system and the network includes file access protocols 75 and a network server interface 73 using communication stacks 74 and network link drivers 72. The file access protocols 75 include a set of industry standard network server protocols such as NFS. Other file access protocols compatible with the network 25 could also be used, such as Novell NCP, LanManager, SMB, etc.

The file access protocols 75 are layered between the communication stacks 74 and the common file system 71. The communication stacks 74 provide the network access and connectivity for the data transmitted to the file access protocol layer 75 from the network link drivers 72. The communication stacks include TCP/IP, IPX/SPX, NETbeui, or others. The network server interface 73 allows porting of the network software and file access protocols 72, 74, 75. This interface 73 is System V Streams. There could be multiple concurrent instances of the file access protocols 75, communication stacks 74, and drivers 72.

The group of software modules providing communication between the common file system and the integrated cached disk array 23 or tape silo 24 includes physical file systems 79 and SCSI CAM 76 which provides a standard framework (SCSI Common Access Method) to the SCSI bus drivers 77. The physical file systems 79 include at least one conventional industry standard-based file system such as the UNIX ufs file system. Other industry standards-based file systems could also be used, such as VXFS, ISO9660, etc. The buffer cache 62 buffers data passed between the SCSI drivers 77 and the physical file system 79. There could be multiple concurrent instances of the network drivers 72, communication stacks 74, file access protocols 75, SCSI drivers 77, and physical file systems 79.

Figure 6:
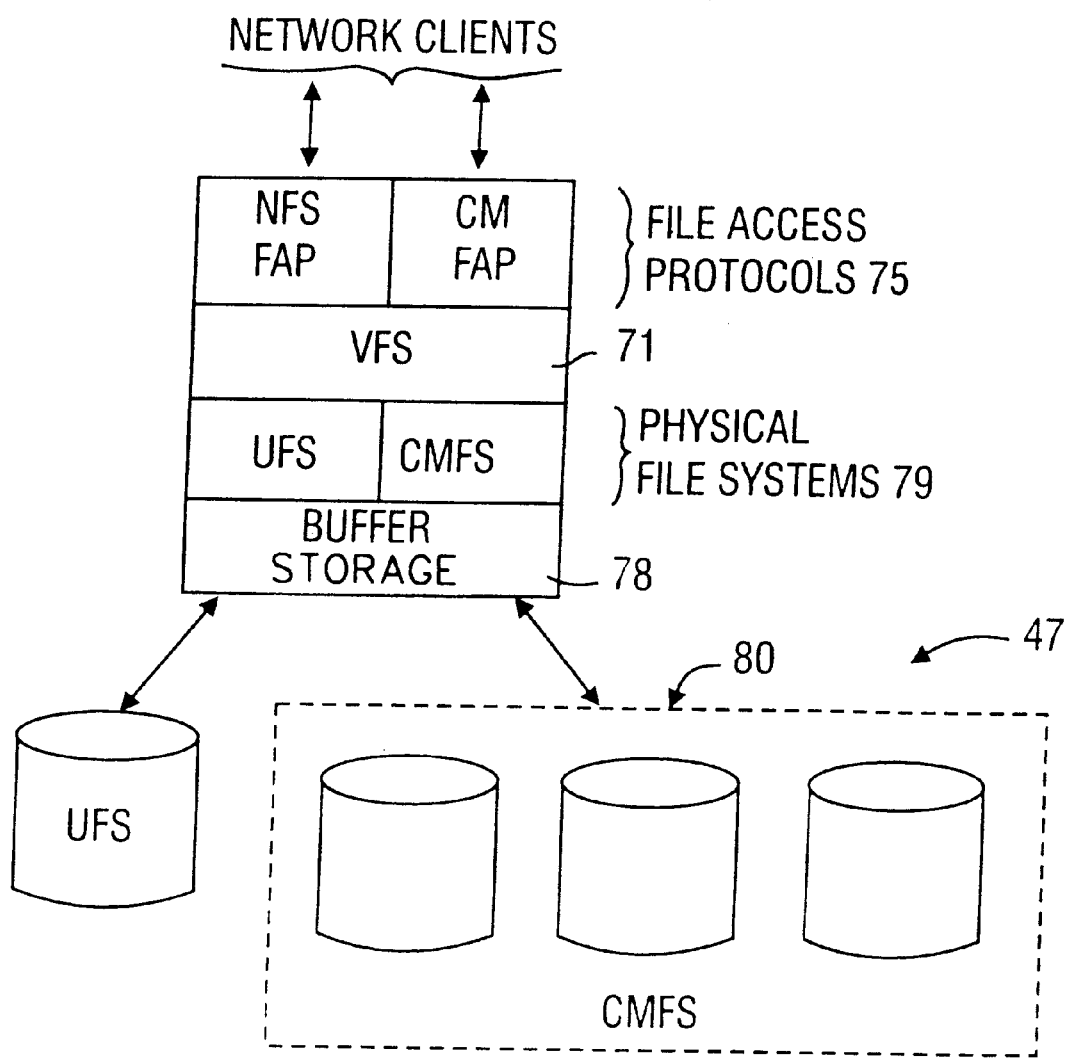
FIG. 6 is a specific example of software modules of FIG. 4.

FIG. 6 is a specific example of software modules of FIG. 5. A conventional UNIX File System (UFS) is a physical file system exported onto the network using NFS. The file system switch that directs client NFS requests to the intended physical file system is implemented using a standard virtual file-system (Vnode/VFS) interface.

The file server software runs as an embedded system that includes a real-time kernel (63 in FIGS. 4 and 5). The main components of the kernel are a task scheduler, frameworks for writing device drivers, and a number of system services that are commonly found in similar real-time kernels. The system services include kernel interfaces to memory management, timers, synchronization, and task creation. All kernel tasks run in a single unprotected address space. As a result of this, no copy operations are required to move data from the cached disk array 23 to the network. Copying is eliminated by passing references to common buffers across all subsystems.

The kernel 63 may use the scheduler described in K. K. Ramakrishnan et al., "Operating System Support for a Video-On-Demand File Service," *Multimedia Systems*, Vol. 3, Springer-Verlag, 1995, pp. 53–65, incorporated herein by reference. This scheduler supports three classes of schedulable tasks; namely, general-purpose tasks, real-time tasks, and isochronous tasks. Isochronous tasks can be used for providing continuous media file access services, which are not necessary for practicing the present invention. Real-time and general-purpose tasks are scheduled using a weighted round-robin scheme.

The general-purpose class supports pre-emptible tasks that are suitable for low-priority background processing. In order to ensure that general-purpose tasks can always make progress, this class is granted a minimum CPU processing quantum.

The general-purpose class is implemented as a standard threads package, with a thread corresponding to a general-purpose task as described herein. A suitable threads package is described in A. D. Birrell, "An Introduction to Programming with Threads," Systems Research Center Technical Report, No. 35, Digital Equipment Corporation, Maynard, Mass., (1989).

The real-time class is suitable for tasks that require guaranteed throughput and bounded delay. Real-time tasks are not pre-emptible; however, a software provision is made to allow for the existence of safe "preemption windows" in which all isochronous tasks can be executed. A weight and a scheduling flag is assigned to every real-time task. The weight is used as the means to limit the amount of processing time taken by the real-time task at each invocation. The scheduling flag is used to indicate that the task has pending work and to signal the scheduler that the task needs to be invoked. The scheduling flag may be set by an interrupt service routine or a task of any class.

In the network file server, real-time tasks are used to implement "polling" device drivers and communication stacks. The method of polling for pending work, as opposed to interrupt-driven processing, contributes to system stability and alleviates most of the problems that arise during overloads. It also provides isolation between multiple real-time tasks that have differing performance requirements. Polling regulates the flow of traffic into the network file server. Just as flow control mechanisms, such as a leaky bucket scheme, protect network resources from large bursts, polling protects the end-system resources by regulating the frequency at which work queues are scanned and limiting the amount of work that may be performed during each scan of the round-robin schedule.

The real-time tasks are implemented as callable routines. Invoking a real-time task amounts simply to a procedure call.

Selecting a real-time task involves scanning a set of scheduling flags; for each flag that is set, the scheduler invokes the corresponding task with the assigned weight as a parameter. The real-time task is expected to process at most the number of work units equal to the task's weight that was passed to it as a parameter. At the completion of each unit of work, the real-time task opens up the "preemption window" which is used by the scheduler to run all the isochronous tasks that may have arrived in the time it took the real-time task to process one unit of work. Upon exhausting the allowed number of work units (the weight) or less, the task voluntarily returns to the scheduler. After having completed one round of scanning the flags, the scheduler switches to the general purpose class.

General purpose tasks that are ready for execution are placed on a "GP ready" queue, which is served in a round-robin fashion. If the "GP ready" queue is empty, the scheduler initiates a new round of servicing the real-time tasks. Otherwise, the scheduler starts a general-purpose quantum timer, and activates the first task from the "GP ready" queue. The task runs until it blocks or the quantum timer expires. If the task blocks, its context is saved on a wait queue and the next task from the "GP ready" queue is restored for execution. If the quantum timer expires, the scheduler saves the context of the currently running task at the end of the "GP ready" queue and switches to a new round of servicing the real-time tasks. The execution of the general-purpose tasks may be preempted one or more times by the isochronous tasks. The execution of the general-purpose class continues after each preemption until the total time spent in processing general-purpose tasks reaches the guaranteed quantum.

In the absence of isochronous tasks, the scheduler can provide guarantees on throughput and delay bounds for real-time tasks (this assumes that all requests destined for a real-time task generate a constant amount of work). A maximum service delay is the time it takes to complete one round of real-time tasks scheduling plus the general purpose time quantum. Let R denote this maximum service delay in steady state. Weights may be assigned to real-time tasks to allocate and guarantee bandwidth averaged over the maximum service delay, R. If W denotes the weight given to a real-time task (the number of units of this task, or requests, processed in one round), then the task's steady state throughput is (W/R) requests per unit time.

III. File Directory Organization

There are two basic objectives in organizing the respective tasks of the cached disk array 23 and the data movers 21 in the network file server 20 of FIG. 1. The first and primary objective is to organize the respective tasks so that the processing load on the cached disk array 23 is balanced with the processing load on the data movers 21. This balancing ensures that neither the cached disk array 23 nor the data movers 21 will be a bottleneck to file access performance.

The second basic objective is to minimize modifications or enhancements to the cached disk array 23 to support network file access.

To some degree, the second objective is driven by a desire to minimize marketing and support issues that would arise if the cached disk array 23 were modified to support network file access. The second objective is also driven by a desire to minimize the addition of processing load on the cached disk array associated with network file access.

The network file server architecture of FIG. 1 permits data mover computers 21 to be added easily until the cached disk array 23 becomes a bottleneck to file access performance, and therefore any additional processing load on the cached disk array associated with network file access would tend to cause a reduction in the network file access performance of a fully configured system employing a single cached disk array.

In a preferred arrangement, the cached disk array 23 recognizes logical block addresses. Each logical block, for example, is a 512 byte sector. The cached disk array has a limited internal locking facility ensuring that reading or writing to a sector is an atomic operation. The cached disk array need not be modified to provide these basic facilities. Network file access, however, requires access to the logical blocks on a file basis and not on a logical block address basis. In particular, a network file access request specifies a file identifier, an offset in the file specifying where to begin the reading or writing of data, and the amount of data to be read or written.

The information for mapping of logical block addresses of storage in the cached disk array 23 to the network files recognized by the network clients 54 is stored in a file directory. The file directory maps a file identifier or name to a string of logical blocks comprising the file, and also records other attributes of the file, such as the file's creation date and the client that created the file; the date the file was last modified and the client that last modified the file; access restrictions upon the file, such as a password or "read only" access; and whether or not the file is presently opened by a client, and the access rights or locks granted to the client for the file or particular logical blocks of the file. At least for recovery purposes, a copy of the file directory is stored in the cached disk array 23 corresponding to the network file data stored in the cached disk array 23. To minimize additional loading of the cached disk array 23, however, the cached disk array is not involved with maintenance of the file directory, other than reading or writing specified logical block addresses of the file directory in response to conventional access commands from the data movers.

IV. Maintenance of Local Caches of File Directory Information

To minimize loading on the cached disk array 23 during file access, each data mover has a local cache of file directory information down to a logical block level of granularity. Moreover, for more uniform distribution of the loading on the data movers, it is desirable for the network clients to have the capability of accessing each file through more than one data mover. In this case, locking information in one local cache of one data mover is replicated in another local cache in another data mover, and a cache consistency scheme ensures that the replicated locking information is consistent in the caches of the data movers.

Various kinds of cache consistency schemes could be used for ensuring that the replicated locking information is consistent in the caches of the data movers. These cache consistency schemes range from a centralized scheme in which the network file directory maintains a primary copy of the locking information, to a decentralized scheme in which the network file directory does not contain any locking information, and all of the required locking information for accessing a file is maintained in each of the data movers providing access to the file.

In general, a data mover can obtain a read lock or a write lock on a group of logical blocks for a network client. A network client must obtain a write lock on a logical block before writing to the logical block, and a network client must have a read lock or write lock on a group of logical blocks before the logical blocks in the group can be read to obtain data that is guaranteed to be consistent between the logical blocks. Once a network client obtains a read or write lock on a group of logical blocks, no other network client can obtain a conflicting read or write lock on the group of logical blocks until the network client owner of the lock releases the lock.

In a centralized cache consistency scheme, a data mover would access the primary copy of the locking information in the cached disk array in order to obtain a new read lock or a write lock over a group of logical blocks. If none of the logical blocks in the group would have a conflicting lock owned by another network client, then the new read lock or write lock would be recorded in the primary copy of the locking information in the cached disk array. Moreover, any copies of the outdated locking information in the local caches of the other data movers would need to be invalidated. In order to assist in the invalidation of the outdated locking information, the primary copy of the locking information in the cached disk array could include a set of flags indicating whether or not a copy of the locking information exists in the local cache of each data mover. The invalidation signals could be sent from the cached disk array to each data mover indicated by a set flag, and once the invalidation signals would be acknowledged by the data movers, the cached disk array could signal the grant of the new lock to the data mover requesting the new lock.

A centralized scheme for ensuring consistency between the local file directory copies in the data movers would increase the loading on the cached disk array in comparison to a decentralized scheme. Therefore, a decentralized scheme is preferred. The preferred cache consistency scheme uses the internal Ethernet link 26 to pass messages between the data movers 21. As a result of this message passing, each data mover maintains a complete list or index to the logical blocks that are currently locked in the files accessible through the data mover.

As shown in scheme, the cached disk array referred cache consistency scheme, the cached disk array 23 stores a network file directory 91 that is current for the logical blocks of storage in the cached disk array that have been allocated to the files listed in the network file directory. The network file directory 91 includes a mapping of the network file identifier or name to a list of logical blocks that comprise the file. Preferably this mapping is organized as a hash table that is indexed by the network file identifier. Entries in the hash table are pointers to respective lists of file information for the files that are indexed by hashing on the network file identifier. The file information for each network file includes the network file identifier, a list or mapping 92 of logical blocks that comprise the network file stored in the cached disk array 23, and a list of file attributes 93. By indexing the hash table and searching through any multiple file identifiers associated with the indexed hash table entry, pointers are obtained to the list of logical blocks that comprise the file and to the list of attributes of the file.

Figure 7:
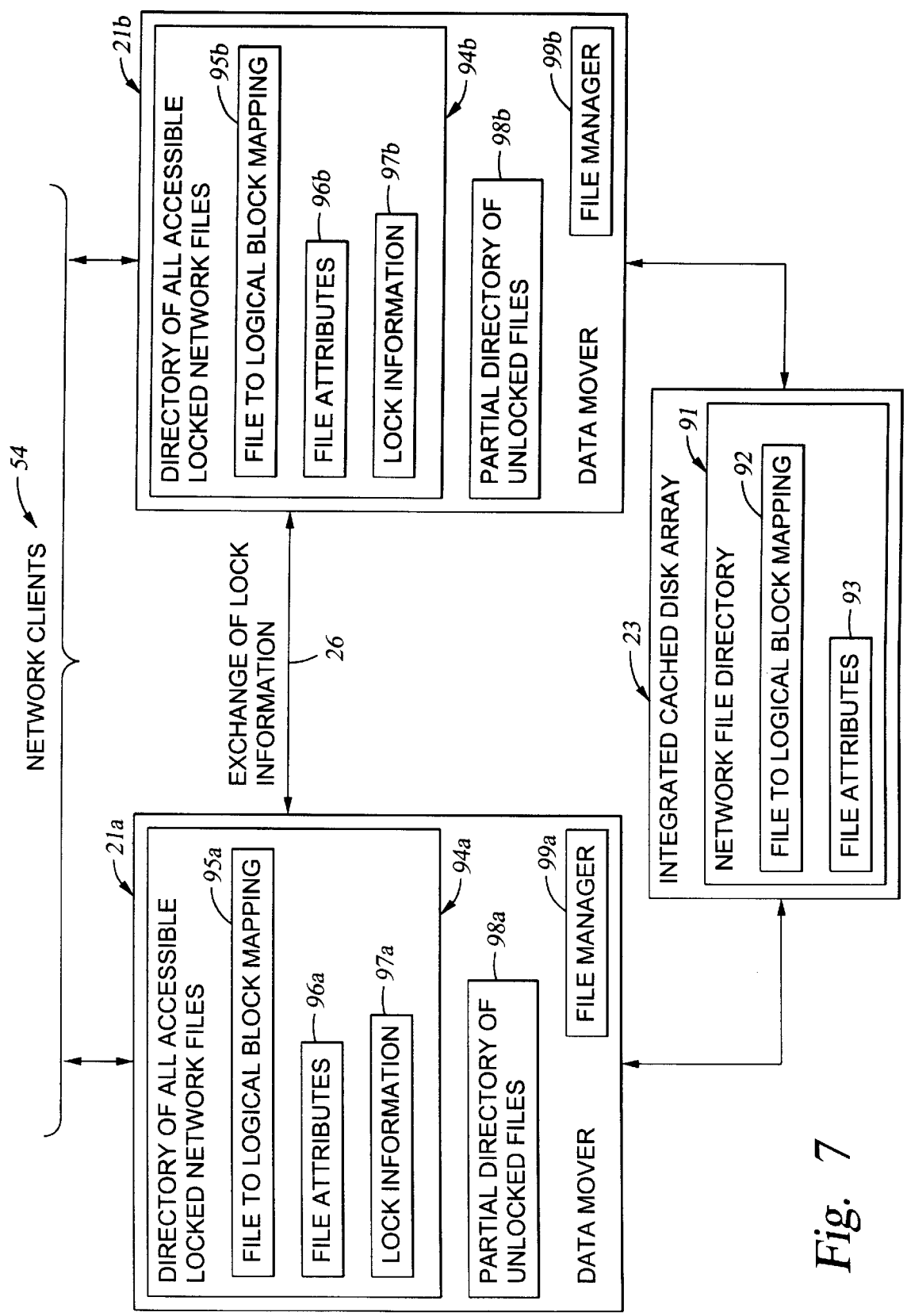
FIG. 7 is a block diagram showing caching, exchange, and replication of file directory and locking information among data mover computers in the network file server of FIG. 1.

Each data mover, such as the data movers 21a and 21b shown in FIG. 7, includes a local directory (94a, 94b) of locking information for all locked network files accessible by the data mover. Each local directory (94a, 94b) of locking information for locked network files includes a file to logical block mapping (95a, 95b), file attributes (96a, 96b), and lock information (97a, 97b). Therefore, when a data mover services a network client request for access to a locked file, there is no cached disk array overhead in managing the lock, because all of the required locking information is already in the local directory of the data mover. For fast access, the local directory (94a, 94b) of locking information from locked network files is kept in semiconductor buffer cache memory (62 in FIG. 5) of the data movers.

As shown in FIG. 7, each data mover may also include a partial directory of unlocked files (98a, 98b) accessible by the data mover. The partial directory of unlocked files (98a, 98b), for example, includes the file to logical block mapping and the file information of files that were once locked and are no longer locked. Information for a file is retained in the partial directory of unlocked files until the cache memory storing this information is needed for other purposes, such as caching directory information for another file that is about to be accessed. For example, when a file becomes unlocked, a pointer to the local directory information is placed on the tail of a least-recently-used (LRU) list. When cache memory space for caching new file information is needed, a pointer is removed from the head of the LRU list in order to re-use the cache memory space indicated by the pointer.

Figure 9:
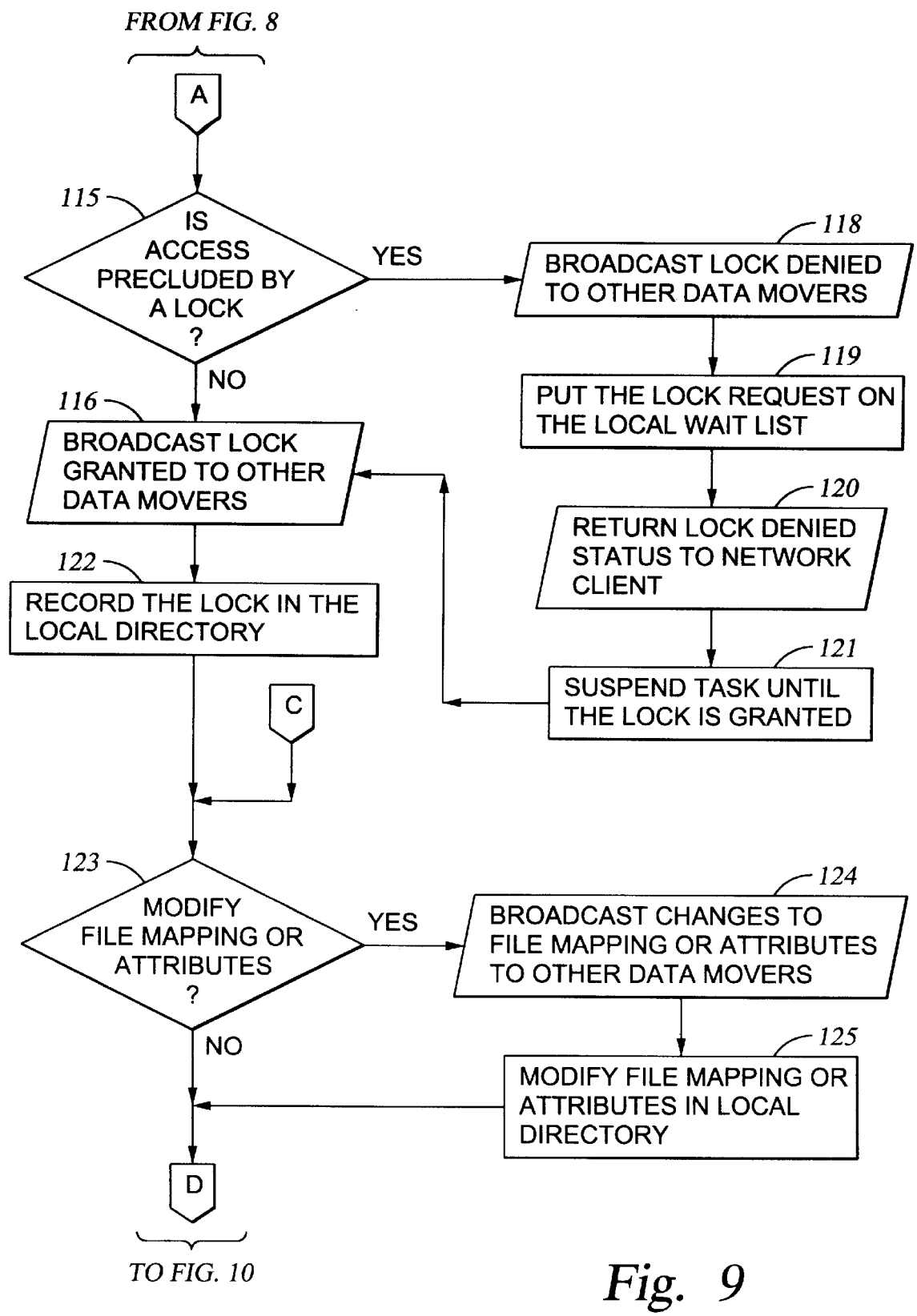
FIG. 9 is a second portion of the flowchart begun in FIG. 8.
Figure 10:
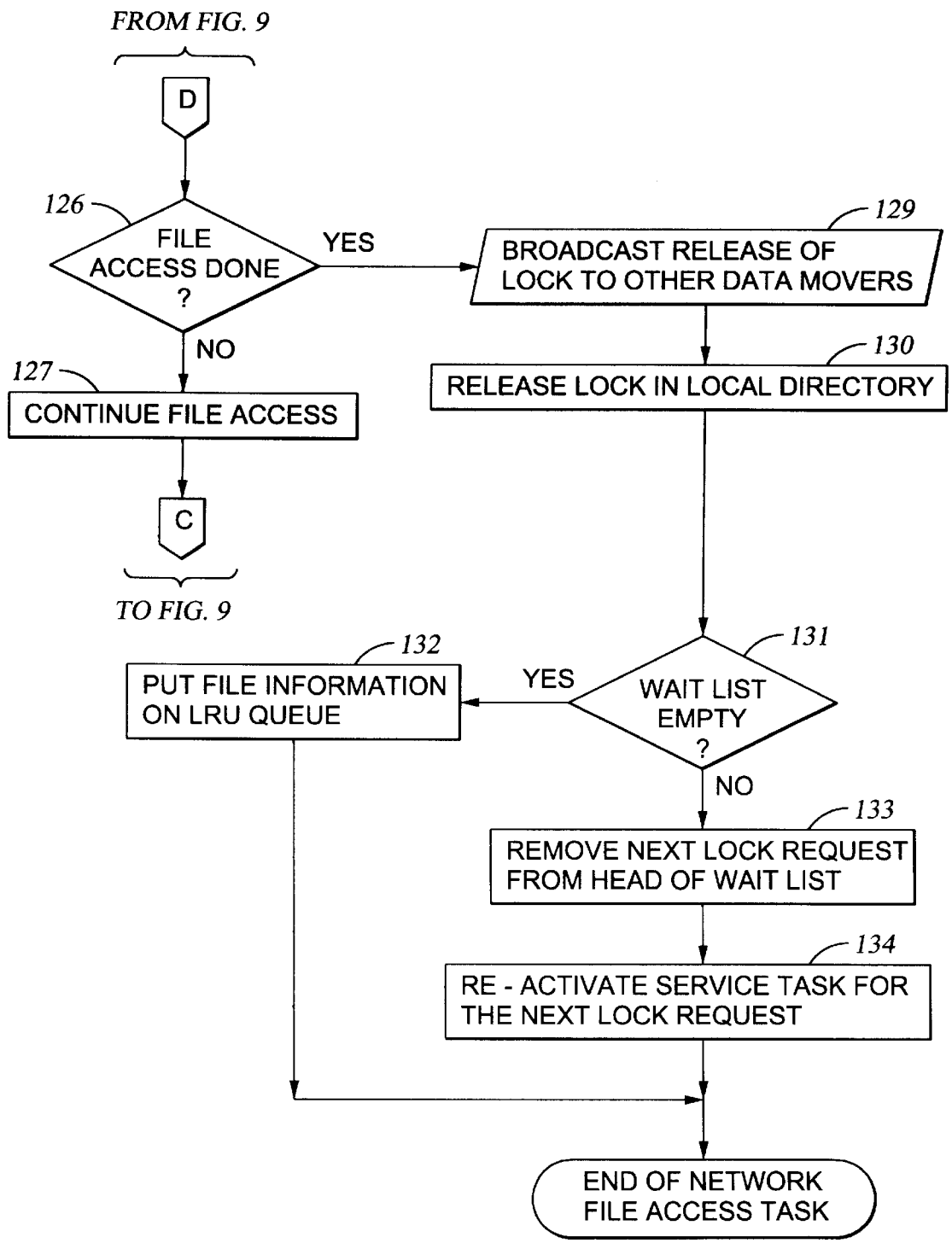
FIG. 10 is a third portion of the flowchart begun in FIG. 8.

Each data mover has a respective copy of a file manager program 99a, 99b that manages the local file directory and the locks on the files. In general, the file manager program 99a, 99b services network file access tasks as shown in the flowchart of FIGS. 8 to 10.

Figure 8:
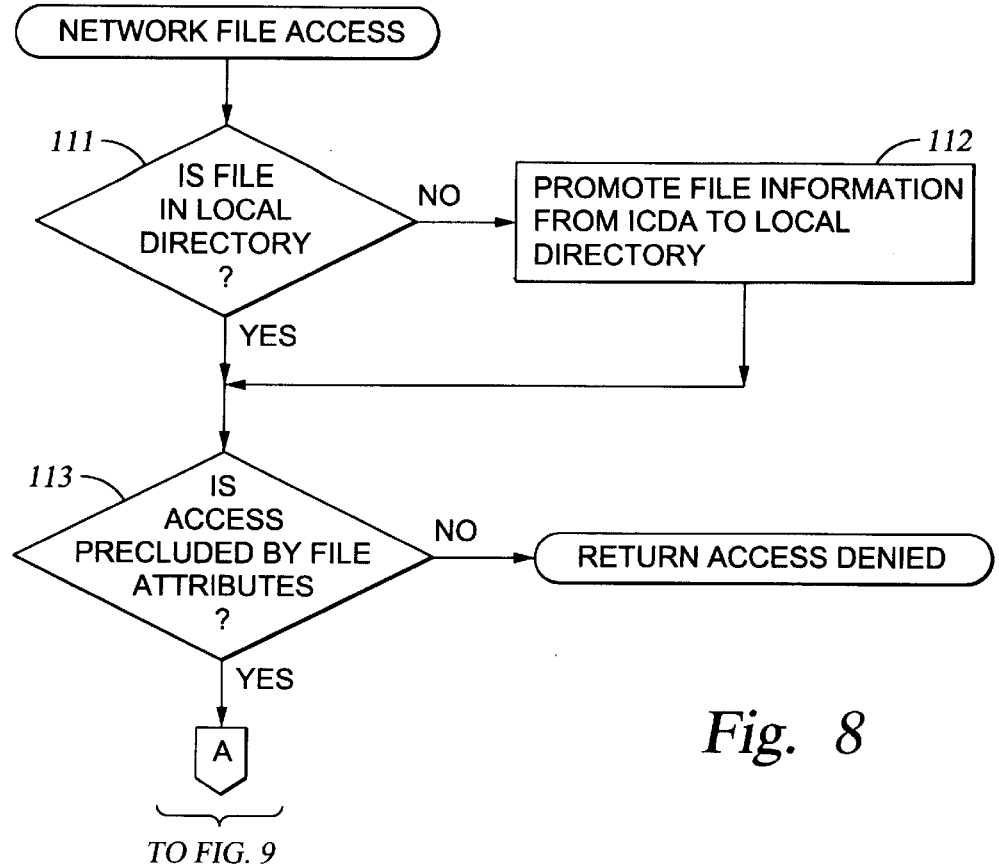
FIG. 8 is a first portion of a flowchart illustrating a file manager program in a data mover computer that caches, exchanges, and replicates file directory and locking information among the data mover computers during a file access task in the network file server of FIG. 1.

In a first step 111 of FIG. 8, servicing of a network file access task begins by checking whether the file to be accessed is indexed in local file directory; i.e., whether it is in the directory (95a, 95b) of all locked network files accessible by the data mover, or in the partial directory (98a, 98b) of unlocked files accessible by the data mover. In this regard, a single hash table index can be used for indexing the file information for all locked network files accessible by the data mover, and for indexing the file information in the partial directory (98a, 98b) of unlocked files accessible by the data mover. A flag associated with the file information indicates whether or not there is a lock on the file. If this file-level lock flag is set, then there is a lock on the file, and the file is not on the LRU queue and therefore its file information is retained in the local directory. If this file-level lock flag is not set, then there is not a lock on the file, and the file will be on the LRU queue and therefore its file information will not necessarily be retained in the local directory.

If access to the hash table index and searching of any list indicated by the indexed hash table entry fails to find the desired file, then the file information is not in the local file directory. Therefore, in step 112, the network file directory 91 in the cached disk array 23 is accessed to promote the file information (92 and 93 in FIG. 7) for the file from the directory 91 to the local directory in the data mover.

In step 113, the file attributes are inspected to determine whether they preclude access by the client. For example, the file may have a security level attribute, in which case a client must have a security level of at least the security level attribute to access the file. The file could have a "private" attribute permitting access only by the original creator of the file, or the file could have a read-only attribute permitting the file to be read by any client having a sufficient security level but written to or deleted only by the original creator of the file. The file could also have a list of clients, each of which could have specified read-write or read-only privileges. If client access to the file is not precluded by the file attributes, then execution continues to step 116 in FIG. 9.

In step 115 of FIG. 9, the lock information (97a, 97b in FIG. 7) for the file is inspected to determine whether the requested access is currently precluded by a lock. For example, read-only or read-write access of the file is precluded by an existing write lock on any file portion to be accessed unless the access is being requested by the client owning the write lock, and read-write access of the file is also precluded by an existing read lock on any file portion to be accessed.

If the requested file access is not precluded by a lock, then in step 116 a message is broadcast over the Ethernet link (26) to the other data movers providing access to the file. These other data movers record the lock in their local directories. If the requested file access is found in step 116 to be precluded by a lock, then in step 118 a lock denied message is broadcast to the other data movers providing access to the file. In step 119, each of the data movers providing access to the file places the lock denied message on a local wait list for the file. Next, in step 120, a lock denied status message can be returned to the network client having requested file access, to indicate that there will be a delay in providing file access due to conflicting locks. Then, in step 121, the file access task is suspended until the lock is granted.

Since each of the data movers providing access to the file to be accessed has a wait list recording the suspended task, once the conflicting locks are removed, each data mover knows whether or not there is a next suspended request that should be granted. When the file access request of the current task is the next suspended request that should be granted, it is removed from the wait list, and execution continues from step 121 to step 116 to broadcast the grant of the lock to the other data movers providing access to the file. After step 116, the lock is recorded in the local directory. In a similar fashion, each of the other data movers providing access to the file removes this next suspended request from its local wait list, and upon receiving the lock granted message, also records the lock in its local directory.

If a write lock is granted, file access may modify the file mapping or attributes that govern file access and are stored in the local directories of the data movers providing access to the file. If such file mapping or attributes are modified, as tested in step 123, then in step 124 the changes to the mapping or attributes are broadcast over the Ethernet (26) to the other data movers providing file access, and in step 125, each of the data movers providing access to the file modifies the file mapping or attributes in its local directory. Execution continues in step 126 of FIG. 10.

In step 126 of FIG. 10, execution continues to step 127 until file access is finished. In step 127, file access continues, for example data is read from or written to the file, and after step 127, execution continues to step 123 of FIG. 9. Eventually file access is done, and execution branches from step 126 to step 129. In step 129, release of the lock is broadcast to the other data movers providing access to the file, and then in step 130, each of the data movers providing access to the file releases the record of the lock in its local directory. If the wait list for the unlocked file is empty, as tested in step 131, then in step 132 the data mover places the file information for the unlocked file on the LRU queue. Otherwise, in step 133 the data mover removes the next lock request from the wait list for the unlocked file, and the network file access task is finished. (Steps 131 to 133 are also performed by the other data movers providing access to the file in response to receipt of the "release lock" message broadcast in step 129.) Then in step 134, the data mover servicing the task of the next lock request reactivates servicing of this suspended task, so it continues in step 116 of FIG. 9. The current task for network access to the unlocked file is finished.

Figure 11:
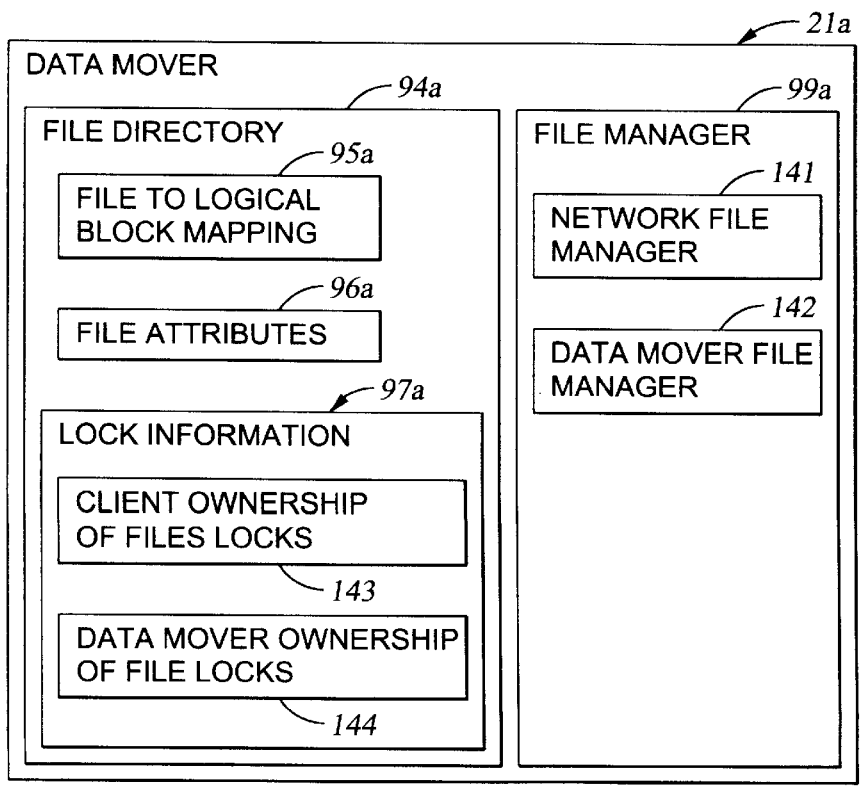
FIG. 11 is a block diagram of a preferred implementation of the file directory, locking information, and file manager program in a data mover computer.

Turning now to FIG. 11, there is shown a block diagram of a preferred implementation of the file manager software 99a for caching of file directory information in each of the data movers, such as the data mover 21a. The file manager 99a includes a network file manager program 141 and a data mover file manager program 142.

The network file manager program 141 is a conventional network file manager program that is modified for use with the data mover file manager program 142. For example, a suitable conventional network file manager program is available from Sun Microsystems Inc. The conventional network file manager program recognizes the file to logical block mapping 95a for reading and writing to the logical blocks. The conventional network file manager program also recognizes the file attributes 96a and manages network client ownership of file locks. The conventional file manager program, however, has no knowledge of the different data movers in the network file server, since the conventional file manager program is written for a server in which the conventional file manager program services all network file access requests recognized by the server.

In addition to the client ownership of file locks 143, the network file server including the data mover 21a has data mover ownership of file locks 144. In addition, the amount of locking information exchanged between the data movers over the Ethernet (26 in FIG. 2) can be reduced considerably by replicating in the data movers only the data mover ownership of file lock information and not the client ownership of file lock information. Therefore, if a network client were to open a file for a write operation by accessing the file from one data mover, the client would not be able to simultaneously access the file from another data mover. In practice, this limitation is insignificant in comparison to the increase in performance obtained by not exchanging or replicating client ownership information. Another advantage is that by not replicating client ownership information, the data mover file manager program 142 can be relatively independent from the network file manager program 141. The network file manager 141 manages the client ownership of the file locks 143 substantially independent of the data mover ownership of the file locks 144, and the data mover file manger 142 manages the data mover ownership of file locks substantially independent of the client ownership of file locks. Moreover, the network file manager 141 is primarily responsible for communication with network clients directing requests to the data mover, and the data mover file manager 142 is primarily responsible for communicating with other data movers by exchanging messages over the Ethernet (26 in FIG. 2).

Figure 12:
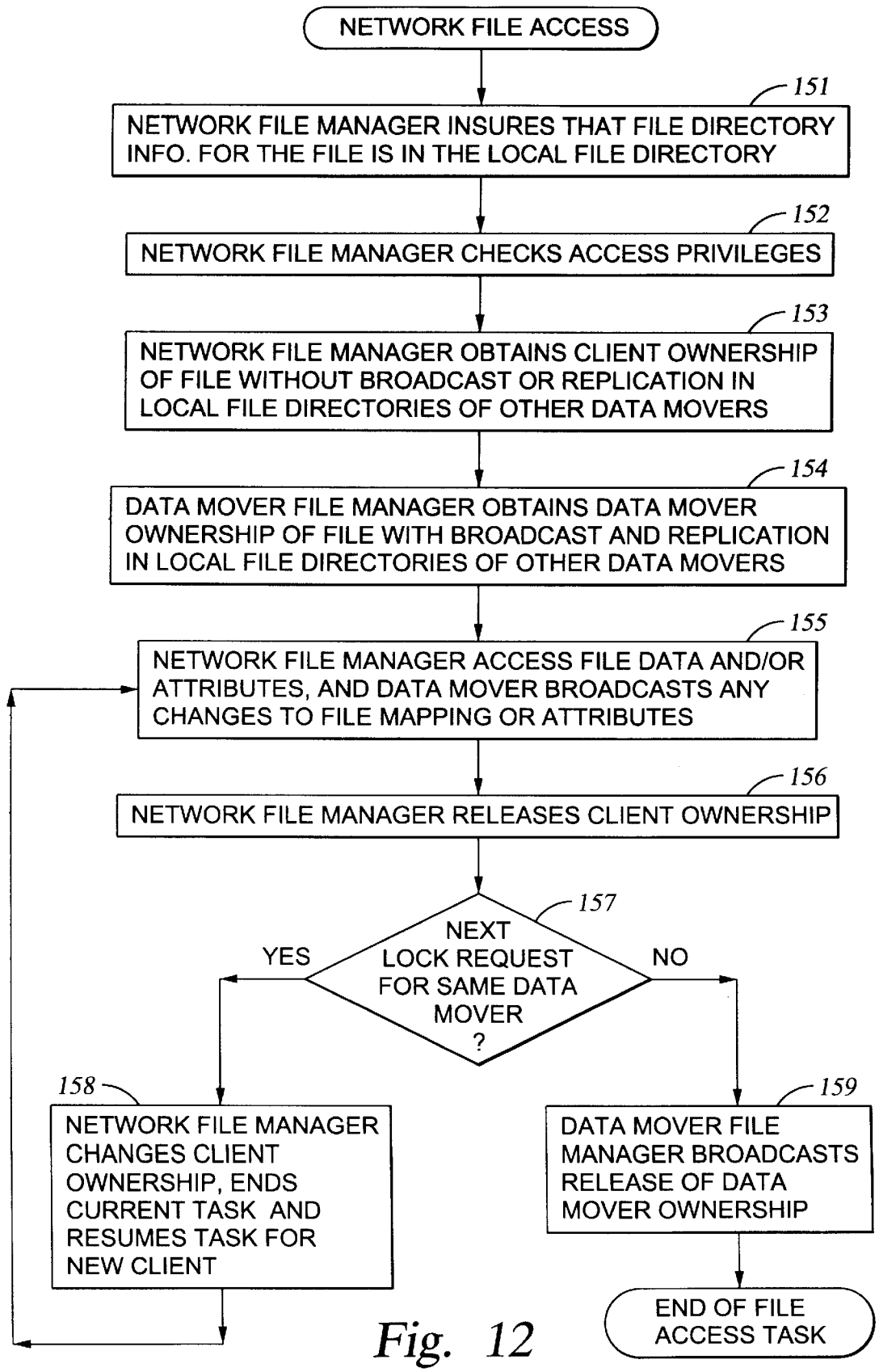
FIG. 12 is a flowchart illustrating the operation of the file manager program shown in FIG. 11.

The division of network file management responsibilities between the network file manager 141 and the data mover file manager 142 is illustrated by the flowchart in FIG. 12. In a first step 151, the network file manager insures that file directory information for the file is in the local file directory, corresponding to steps 111 and 112 of FIG. 8. In the step 152, the network file manager checks access privileges to determine whether file access is precluded by the file attributes, corresponding to step 113 of FIG. 8.

In step 153, the network file manager obtains client ownership of the file to be accessed without broadcast or replication of client ownership in the local file directories of other data movers. If the file is locked, then the request is placed on the local wait list linked to the file, until client ownership of the file is granted.

In step 154, the data mover file manager obtains data mover ownership of the file with broadcast and replication of the data mover file ownership in the local file directories of the other data movers permitting access to the file, corresponding to steps 116 and 122 of FIG. 9. If the file is locked, and if there is no prior request on the local wait list and the file lock is owned by the data mover, or if the immediately prior request on the local wait list is a request of the data mover, then there is no need to broadcast a "lock denied" request to other data movers to ensure fair servicing of waiting client requests on a first come, first serve basis. Otherwise, if the file is locked, then the data mover file manager broadcasts a "lock denied" request in order to place the request on the wait lists of the other data movers to ensure fair servicing of the request. The "lock denied" or "lock granted" messages are broadcast over the Ethernet among the data movers with identification of the data mover originating the request, and without any identification of the client originating the request, corresponding to steps 123–125 in FIG. 9. Once file access is finished, execution continues to step 156.

In step 156, the network file manager releases client ownership. Then in step 157 the local wait list for the file is inspected to determine whether, at the head of the list, there is a next request for the same data mover. If so, there is no need to release data mover ownership over the file. Execution continues to step 158 where the network file manager changes client ownership to the client of the next request, ends servicing for the current file access task, and resumes the file access task for the next request. Execution then continues in step 155 to perform file access.

If in step 157 there is not a next lock request for the same data mover, then execution branches to step 159. In step 159, the data mover file manager broadcasts release of data mover ownership, and the file access task is finished.

V. File System Cache and Protocol for Truly Safe Asynchronous Writes

As described above with reference to FIG. 6, one of the file access protocols desirable for use in a network file server is NFS, and one of the physical file systems desirable for use in a network file server is the UNIX File System (UFS).

NFS Version 2 has synchronous writes. When a client wants to write, it sends a string of write requests to the server. Each write request specifies the client sending the data to be written, a file identifier, and an offset into the file specifying where to begin the writing of the data. For each write request, the server writes data and attributes to disk before returning to the client an acknowledgement of completion of the write request. (The attributes include the size of the file, the client owning the file, the time the file was last modified, and pointers to the locations on the disk where the new data resides.) This synchronous write operation is very slow, because the server has to wait for disk I/O before beginning the next write request.

NFS Version 3 has asynchronous writes. In the asynchronous write protocol, the client sends a string of write requests to the server. For each write request, the server does a "fast write" to random access memory, and returns to the client an acknowledgment of completion before writing attributes and data to the disk. At some point, the client may send a commit request to the server. In response to the commit request, the server checks whether all of the preceding data and attributes are written to disk, and once all of the preceding data and attributes are written to disk, the server returns to the client an acknowledgement of completion. This asynchronous write protocol is much faster than the synchronous write protocol. However, there is a data security problem with its implementation in a UNIX server.

Figure 13:
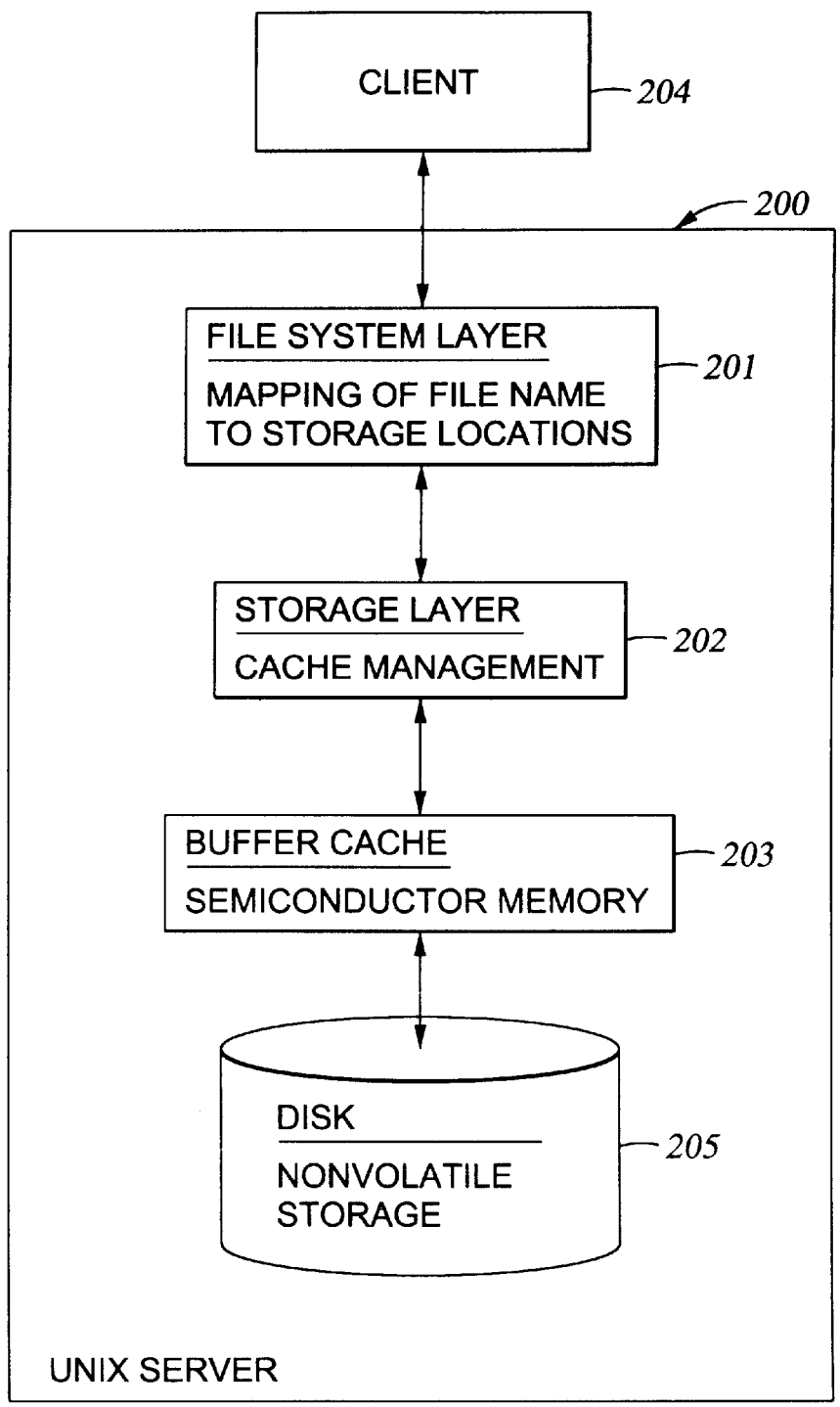
FIG. 13, labeled "Prior Art," is a block diagram of a conventional UNIX server.

In any kind of conventional UNIX server 200, as illustrated in FIG. 13, data passes through a number of layers 201, 202, 203 from a client 204 to disk storage 205. These layers include a file system layer 201 which maps file names to data storage locations, a storage layer 202 which performs cache management such as setting write pending flags, and a buffer cache layer 203 where data is stored in random access semiconductor memory.

In response to a commit request, the storage layer 202 checks if writes to disk 205 from buffer cache 203 are pending, and acknowledges completion once writes are no longer pending. When a file is modified, data and attributes are written to the file. Because of the way the file system is structured, data and attributes can be written in any order.

If the new data is written to disk storage 205 before the new attributes and the server crashes, then upon recovery, everything in the buffer cache 203 may be lost. An attempt is therefore made to recover from whatever can be found on disk 205. The attributes are found and decoded to obtain pointers to data. The file may be corrupted if not all of the new attributes were written to disk. Some old attributes on the disk may point to old data, and some new attributes on the disk may point to new data.

If the new attributes are written before the new data and the server crashes, then upon recovery, the new attributes are found and decoded to obtain pointers to data. The file may be corrupted if not all of the new data were written to disk. In addition, the pointers for the new data not yet written may point to blocks of data from an old version of a different file. Therefore, the data security problem may occur, since the client owning the file being accessed may not have access privileges to the old version of the different file.

Figure 14:
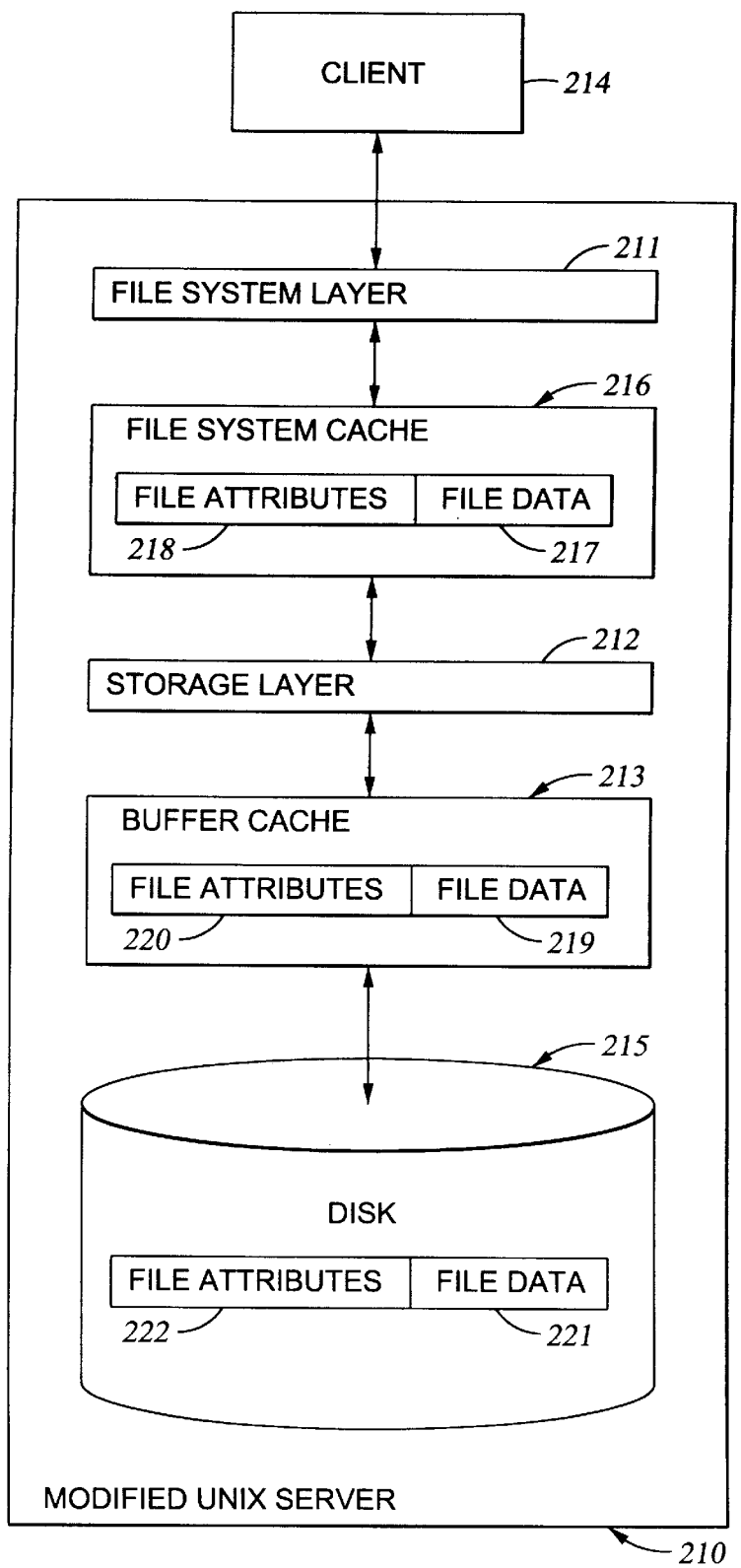
FIG. 14 is a block diagram of a UNIX server that has been modified to solve an asynchronous write security problem.

The asynchronous write security problem is solved by a modified server implementing a file system cache protocol. As shown in FIG. 14, a modified server 210 also passes data from a client 214 to disk 215 through a file system layer 211, a storage layer 212, and a buffer cache 213. In addition, the modified UNIX server 210 has file system cache 216. Data 217 and attributes 218 are stored in the file system cache of each data mover and are not written down to storage until receipt of a commit request from the client 214. When the commit request is received, the data 217 is sent before the attributes 218 from the file system cache to the storage layer 212.

The modified server 210 is constructed so that the order in which the file data 217 and the file attributes 218 are written from the file system cache 216 to the storage layer 212 is the order in which the file data 219 and file attributes 220 are written to nonvolatile storage. In other words, if file attributes are found in storage upon recovery, then so will the corresponding file data. This can be done in a number of ways. For example, all of the data and attributes written to the storage layer 212 are written to the buffer cache 213, and then the file data 219 in the buffer cache 213 are written to the disk 215 before the file attributes 220 are written to the disk 215. Upon recovery, the file data 221 and the file attributes 222 are read from the disk 215. Alternatively, the buffer cache 213 can be nonvolatile, battery-backed semiconductor memory, so that the order in which attributes and data are written from the buffer cache 213 to the disk 215 does not matter.

Figure 15:
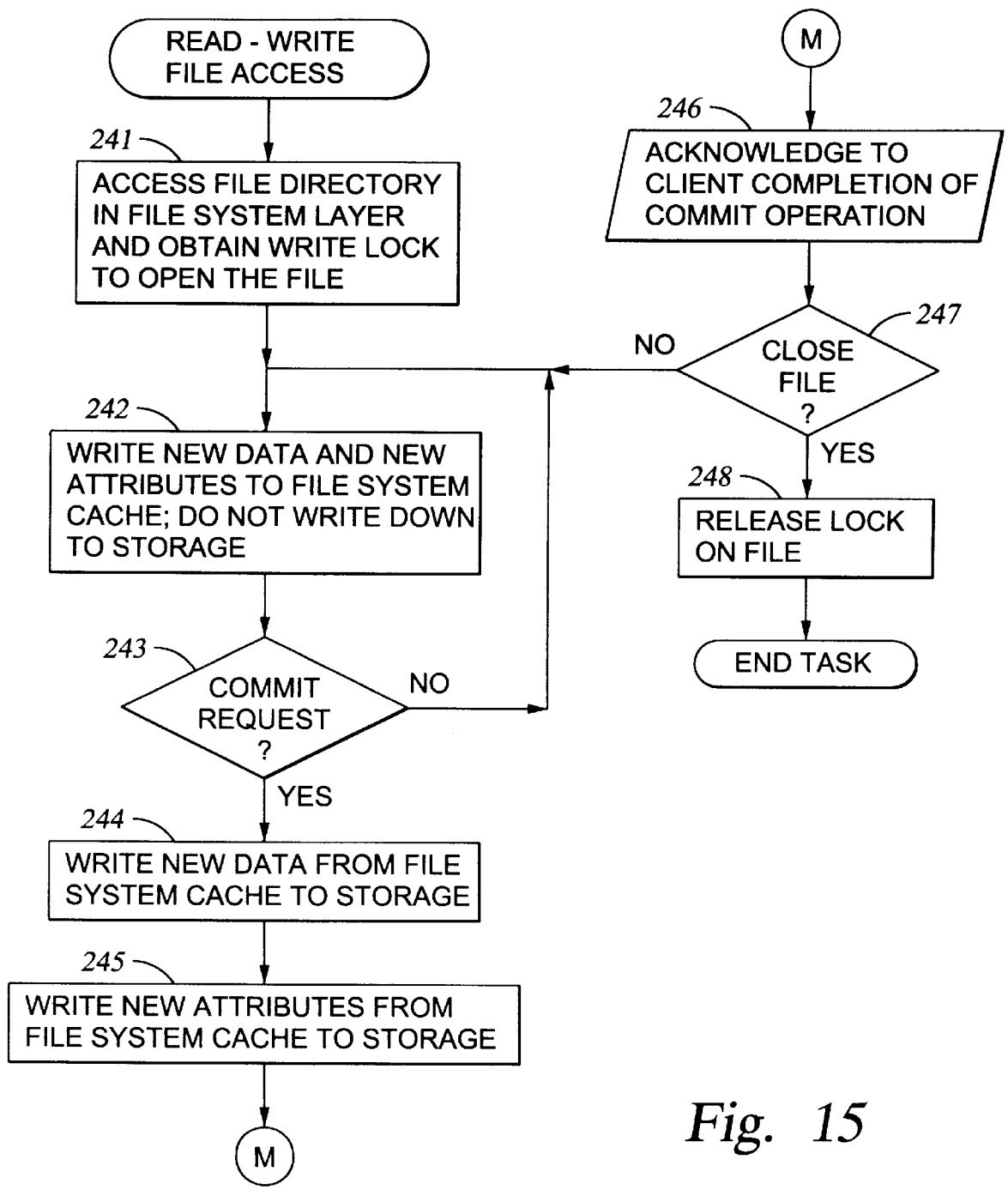
FIG. 15 is a flowchart of programming in a file system layer of the modified UNIX server of FIG. 14.

A flowchart of the operation of the modified server for servicing a read-write file access from a client is shown in FIG. 15. This flowchart represents control logic in the file system layer. In a first step 241, the file system layer of the server receives the client request and accesses a file directory in the file system layer and obtains a write lock to open the file. Next, in step 242, the file system layer writes new file data from the client and new file attributes to the file system cache, but does not write the new file data and new file attributes down to the storage layer. The file system may continue to write new file data and new file attributes to the file system cache until a commit request 243 is received from the client. When a commit request is received, as tested in step 243, then in step 244, the new file data written into the file system cache in step 242 is written from the file system cache to storage. Thereafter, in step 245, the new file attributes written into the file system cache in step 242 are written from the file system cache to storage. Thereafter, in step 246, the file system sends to the client an acknowledgement of completion of the commit operation.

One particular kind of commit request is a request to close the file, indicating that read-write access of the file is finished. After step 246, in step 247, execution branches depending on whether the last commit request was a request to close the file. If not, execution loops back to step 242. If so, execution continues to step 248. In step 248, the write lock on the file is released to close the file, and the read-write file access task is finished.

The file system level cache protocol of FIG. 15 is best implemented in the network server 20 of FIG. 2 by incorporating the file system level cache (216 of FIG. 14) in the buffer cache (62 in FIG. 5) of semiconductor random access memory of each of the data movers 21 of FIG. 2. In this case, the new file attributes and the new file data are indexed by the file directory 94a in FIG. 11. The protocol of FIG. 15 is programmed into a UFS physical file system 79 of FIGS. 5 and 6. The storage layer 212, buffer cache 213 and disk 215 of FIG. 14 are in the cached disk array 23 of FIG. 2. In particular, the storage layer 212 is comprised of the channel directors 43 in FIG. 3, the buffer cache is comprised of the cache memory 41 of FIG. 3, and the disk 215 is comprised of the disk array 47 of FIG. 3.

The cache memory 41 in the cached disk array 23 of FIG. 3 is battery backed so that the order in which file attributes or file data are written from the cache memory 41 to the disk array 47 is not important. The cached disk array 23 has a battery that can also power at least one of the disk drives in the disk array 47 during a system failure. The battery has a sufficient capacity so that when a system failure occurs, the battery can power the cached disk array to write all write pending data in the cache memory 31 to the disk array 37.

The cached disk array 23 functions in a "fast write" mode. When the UFS physical file system 79 of FIG. 6 writes down new file data from the file system cache, for example, it waits for the cached disk array 23 to acknowledge receipt of the new file data before writing down the new file attributes. The cached disk array, however, acknowledges receipt and storage of the new file data as soon as the new file data is stored in the cache memory 41; the cached disk array does not wait for the data to be written to the disk array 47 before acknowledging receipt and storage of the new file data. Then the UFS physical file system 79 writes down the new file attributes from the file system cache to the cached disk array 23. The cached disk array acknowledges receipt and storage of the new file attributes as soon as the new file attributes are stored in the cache memory 41; the cached disk array does not wait for the new file attributes to be written to the disk array 47 before acknowledging receipt and storage of the new file attributes. The UFS file system 79 acknowledges to the client the completion of the commit operation (step 246 of FIG. 15) as soon as it receives from the cached disk array 23 the acknowledgement of receipt and storage of the new file attributes.

After the new file attributes and new file data are written down to storage (in steps 244 and 245 of FIG. 15), the new file attributes and the new file data can be retained in the file system level cache (216 in FIG. 14). In this case, the file system level cache can be organized in a fashion similar to the buffer cache (213 of FIG. 14). In particular, the file system level cache may have write pending flags, indicating whether or not the file data or file attributes in the file system level cache are new file data or new file attributes written since the last commit request and not yet having been written down to storage. In other words, the file system sets a write pending flag associated with a logical block in the file system cache when a client writes data to the file system, and the file system clears the write pending flag when the storage level acknowledges completion of writing of the logical block to storage.

Preferably the network file system 20 in FIG. 2 uses a good deal of file system cache in the data movers, so that it does not need as much buffer cache in the cached disk array, and the loading on the cached disk array is reduced. In response to a read request from a network client, the file system searches the file system cache, and if the data is found in the file system cache, there is no need to access the buffer cache in the cached disk array.

In short, the asynchronous write security problem is solved in the preferred embodiment by splitting cache memory requirements between a file system cache and a buffer cache, keeping new file attributes and new file data in the file system cache until receipt of a commit request from the client, and sending the new file data first followed by the new file attributes down to storage upon receipt of the commit request.

VI. Message Collector Queue For Connection Oriented Protocols

As described above, the network file server 20 of FIGS. 1 and 2 supports a number of file access protocols 75 in FIG. 5. These file access protocols use a number of communication protocols, including the User Datagram Protocol (UDP) and the Transmission Control Protocol (TCP).

Figure 16:
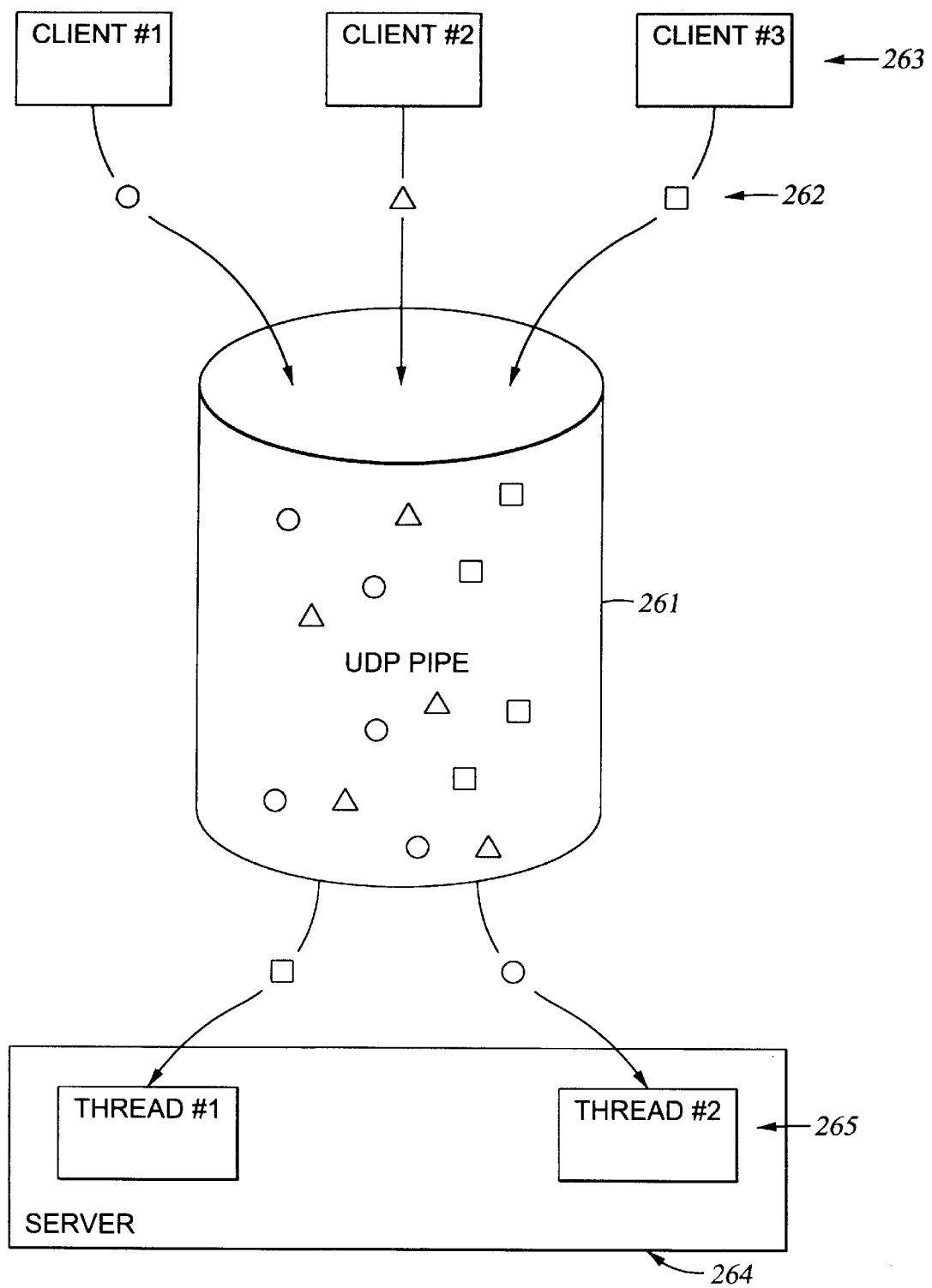
FIG. 16, labeled "Prior Art," is a schematic diagram illustrating message transmission over a network link or pipe in accordance with a User Datagram Protocol (UDP)

As illustrated in FIG. 16, UDP is a connection less protocol. There is one fast pipe 261 conveying messages 262 (e.g., requests) from a number of clients 263 to a server 264. As used herein, the term "pipe" denotes generally a network link or message stream received by the file sever from one or more network clients. The messages 262 (represented individually by respective circle, triangle, and square icons) get mixed together during transmission in the pipe 261, and at the server 264 the messages are serviced by respective code threads 265.

Figure 17:
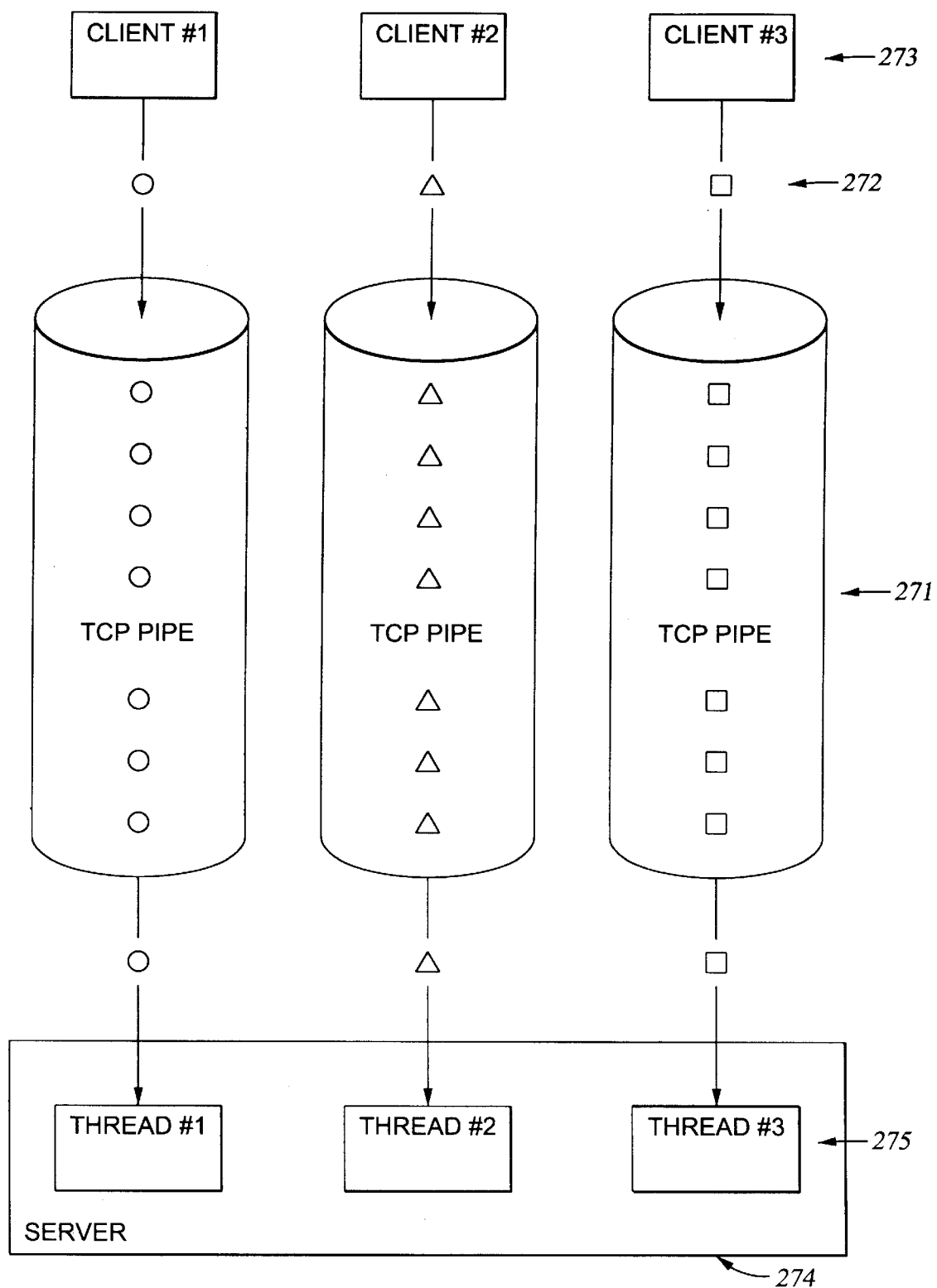
FIG. 17, labeled "Prior Art," is a schematic diagram illustrating message transmission over a network link or pipe in accordance with a Transmission Control Protocol (TCP)

As illustrated in FIG. 17, TCP is a connection oriented protocol. Each of the clients 273 is assigned a separate pipe 271 for sending messages 272 to the server 274, and each pipe 271 is serviced by a respective code thread 275.

In the UDP case, code threads are assigned to respective messages, and there are lots of code threads to service the client messages.

In the TCP case, the threads are assigned to respective pipes, and the pipes are assigned to respective clients. Therefore, the threads remain connected to the respective clients in the case of a series of messages from each client. There are fewer TCP threads, and some threads are very busy and others are not very busy, since the threads remain connected to the clients. As a result, there is less balance; some threads work harder than others, and there is a loss of performance. This occurs in conventional NFS servers, such as NFS servers from Sun Microsystems Inc. and Digital Equipment Corp.

Figure 18:
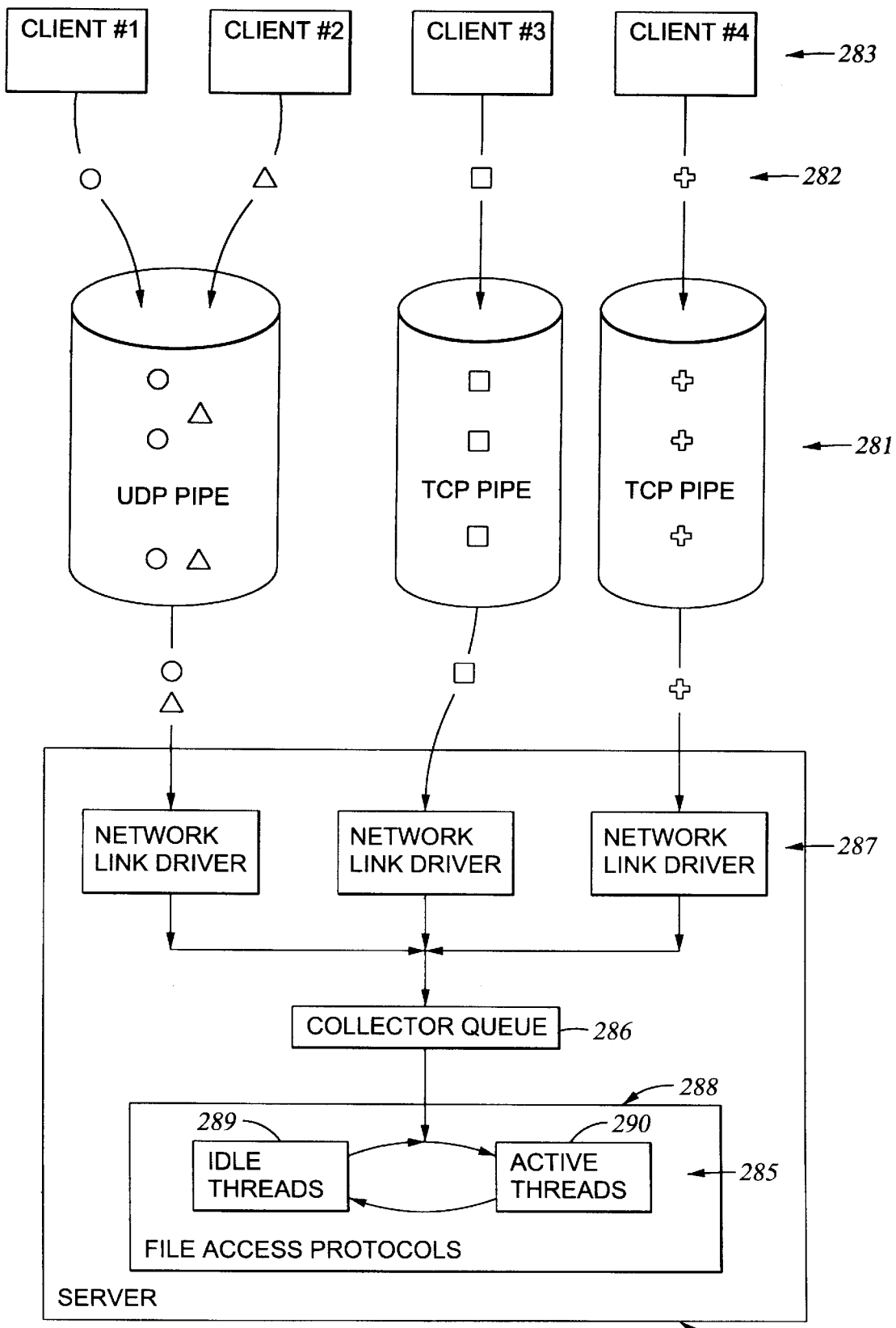
FIG. 18 is a block diagram showing the use of a collector queue combining UDP messages with TCP messages and permitting a next message in the collector queue to be serviced by an idle code thread implementing file access protocols in a server.

In order to minimize the loss of performance due to thread imbalance, a collector queue is used in a file server in order to combine messages from UDP and TCP streams. As shown in FIG. 18, threads 285 of a server 284 receive messages directly from the collector queue 286 rather than individual pipes or streams 281 conveying messages 282 from the clients 283. The messages 282 are received from the pipes or streams 282 by network link drivers 287 and placed in the collector queue 286. In the collector queue 286, messages from a pipe for a connection oriented process such as TCP are mixed and interleaved with messages for other connection oriented and connectionless processes. However, the collector queue 286 maintains the ordering of the messages in each pipe. For example, the collector queue 286 is serviced on a first-in, first-out basis. Any idle thread 289 can pick up a message from the collector queue and become an active thread 290 responding to the message. The threads 285 are components of the software implementing file access protocols 288. The collector queue 286 keeps track of which pipe 281 each message came from, and the reply of the server to each message is directed to the same pipe from which the message came from. Therefore, the collector queue 286 ensures balance and efficiency.

Figure 19:
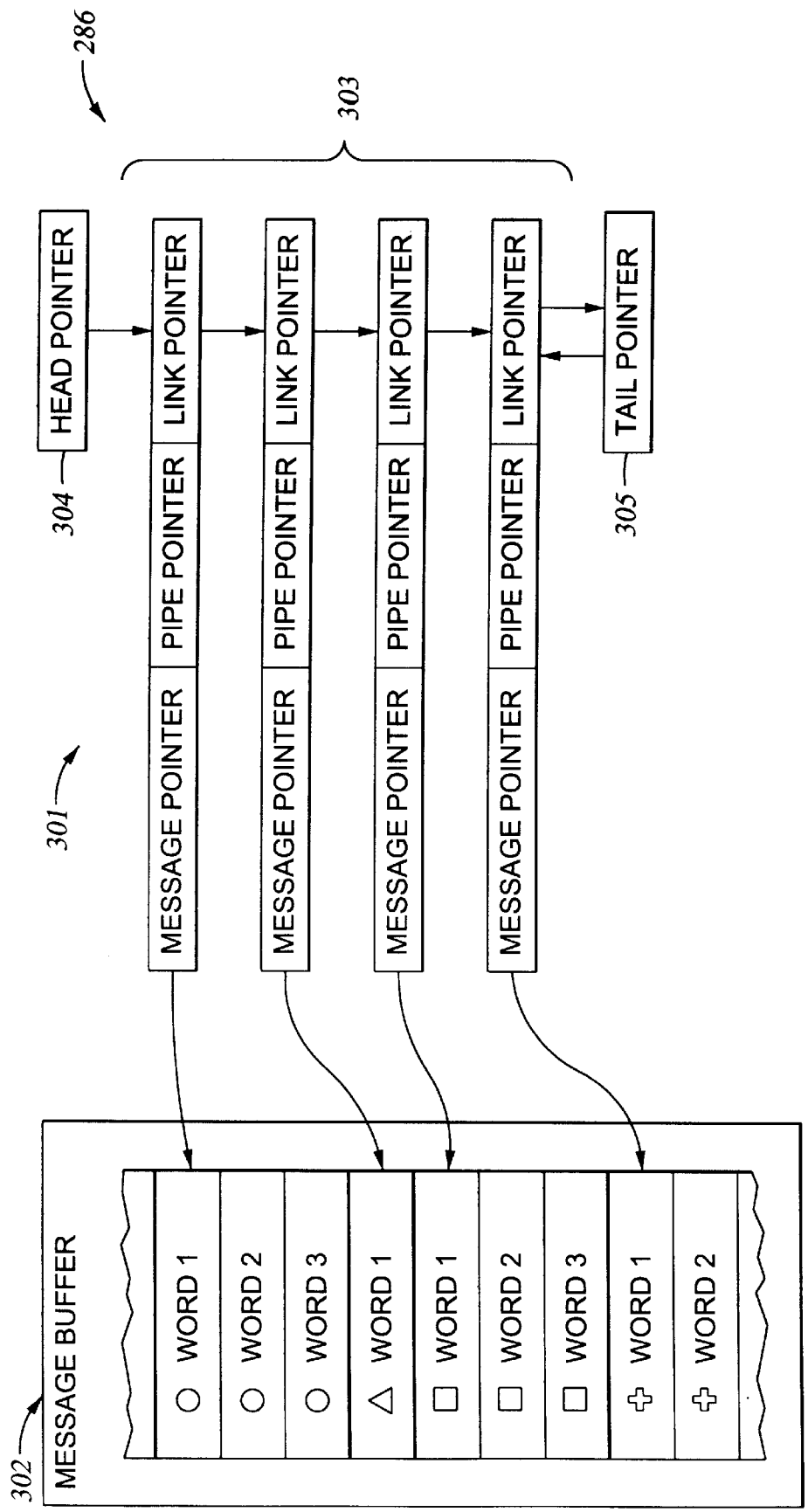
FIG. 19 is a block diagram showing a specific example of construction for the collector queue introduced in FIG. 18.

Turning now to FIG. 19, there is shown a specific example of construction of the collector queue 286. The collector queue 286 includes a singly-linked list 301 of message pointers, and a message buffer 302. The singly-linked list 301 of message pointers includes a series of entries 303, a head pointer 304 pointing to the entry at the head of the list 301, and a tail pointer 305 pointing to the entry at the tail of the list 301. Each entry 303 includes a message pointer, a pipe pointer, and a link pointer.

Each message pointer points to a respective beginning message word in the message buffer 302. Each message in the message buffer 302 may include one or more message words, and the message in the message buffer includes an indication of its length in the message buffer. For example, the first byte in the first word of a message in the message buffer 302 indicates the number of message words that comprise the message.

Each pipe pointer points to the respective pipe from which the respective message originated.

Each link pointer points to the link pointer of a next entry in the list 301 if there is a next entry, and otherwise the link pointer has a value of zero indicating that there is not a next entry.

The head pointer 304 points to the link pointer of the entry at the head of the list 301 if there is an entry at the head of the list. If the list 301 is empty, the head pointer has a value of zero indicating that the list is empty. To remove an entry from the head of the list, the head pointer is read and compared to zero to check if the list is empty, and if not, the link pointer of the entry is read from the memory address indicated by the head pointer, and then the head pointer is set to the value of the link pointer of the entry.

The tail pointer 305 points to the entry at the tail of the list 301 if there is an entry at the tail of the list. If the list 301 is empty, the tail pointer points to the head pointer. To insert an entry onto the tail of the list, the tail pointer is read, and the value of the address of the link pointer of the entry is written to memory at the address indicated by the tail pointer, and then the tail pointer is set to the value of the link pointer of the entry. Moreover, the link pointer of the entry inserted on the tail of the list is set to the initial value of zero indicating it is at the tail of the list.

Figure 20:
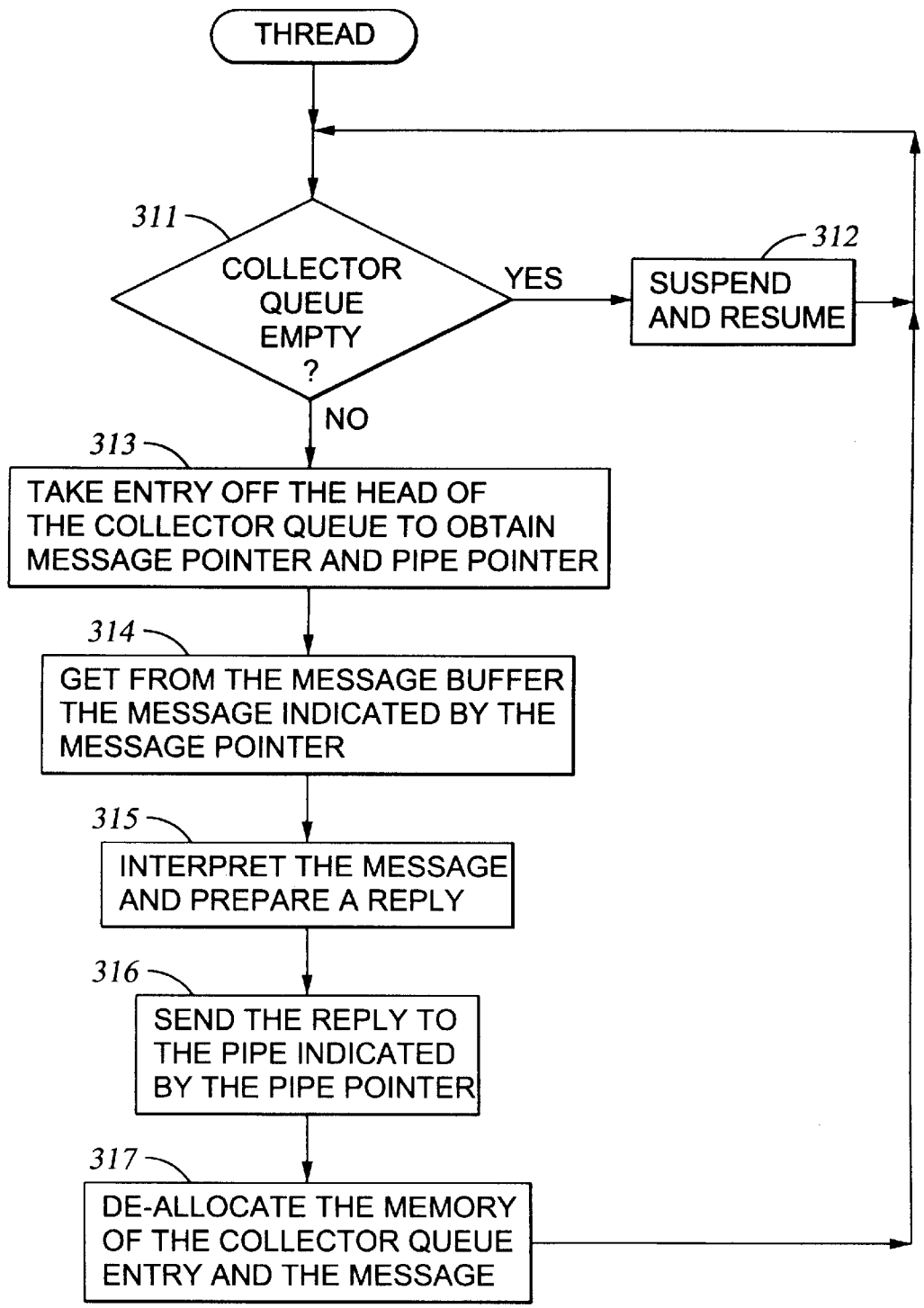
FIG. 20 is a flowchart of programming for a code thread that services a next message in the collector queue.

Turning now to FIG. 20, there is shown a flowchart of the programming for one of the code threads (285 in FIG. 18). In a first step 311 of FIG. 20, the code thread checks whether or not the collector queue is empty. If so, then in step 312 execution of the code thread is suspended (i.e., the thread becomes inactive) for a certain time, and later execution resumes by looping back to step 311. If in step 311 the collector queue is not empty, then execution continues to step 313. In step 313, the entry at the head of the collector queue is removed from the queue to obtain a message pointer and a corresponding pipe pointer. In step 314, the message pointer is used to obtain the corresponding message from the message buffer. In step 315, the message is interpreted and an appropriate reply is prepared. In step 316, the reply is sent to the pipe indicated by the pipe pointer, for transmission to the client that originated the message. Then in step 317 the memory of the collector queue entry removed in step 313 is deallocated and the memory of the message in the message buffer is deallocated, for example, by placing pointers to the collector queue entry and the message words onto free memory lists.

Figure 21:
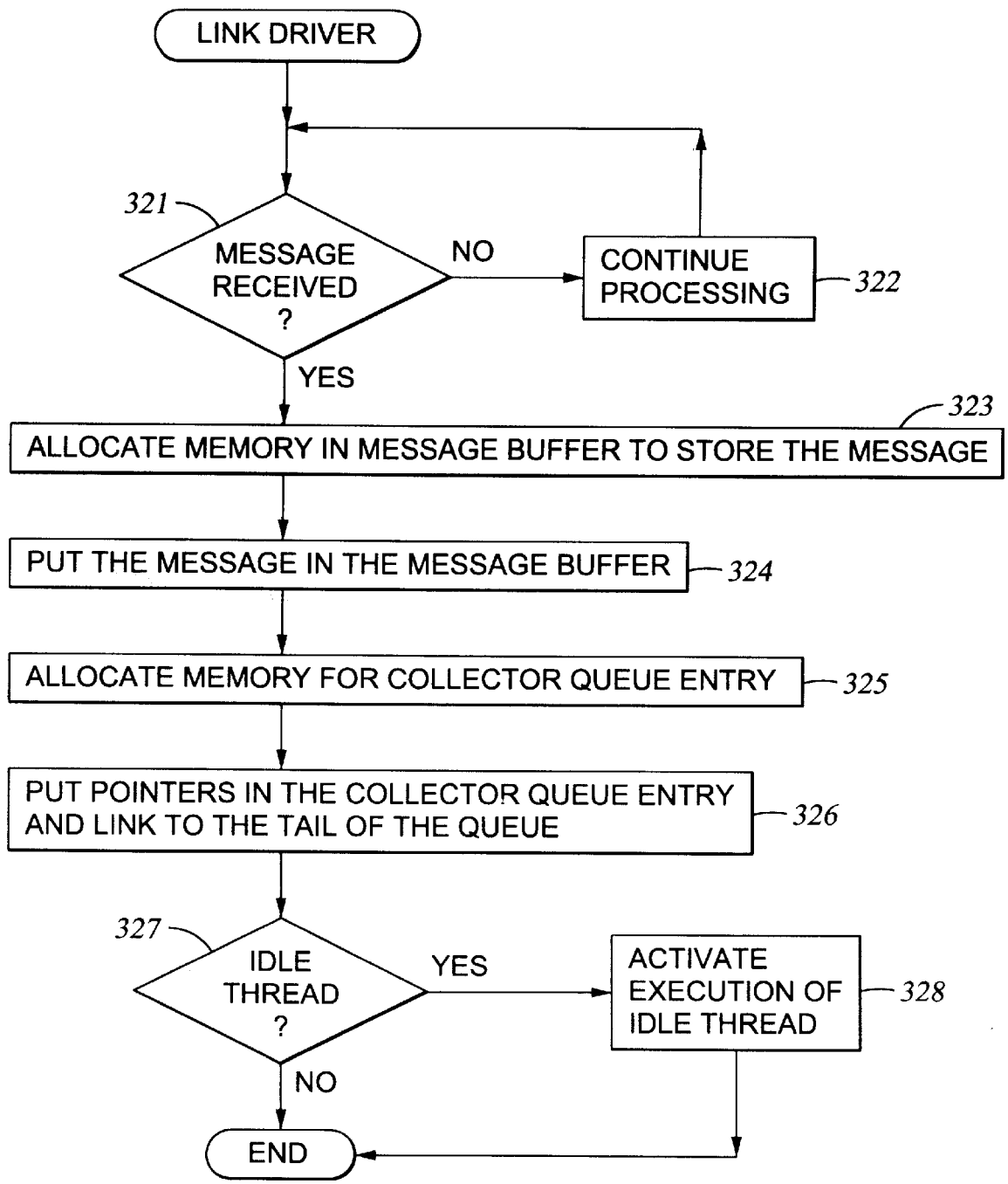
FIG. 21 is a flowchart of programming for a network link driver that inserts a message into the collector queue.

Turning now to FIG. 21, there is shown a flowchart of programming for a network link driver that inserts a message into the collector queue. In a first step 321 execution branches to step 322 to continue processing if a message has not been received from a client. Once a message is received, execution continues to step 323. In step 323, the link driver allocates memory in the message buffer to store the message. Next, in step 324, the link driver puts the message in the message buffer. Then in step 325 the link driver allocates memory for the collector queue entry (in the list 301 of FIG. 19), and in step 326 the link driver puts the pointers (i.e., the message pointer, pipe pointer, and link pointer) into the collector queue entry.

Now that the message has been inserted into the collector queue, in step 327 the link driver checks whether there is an idle thread. If not, then the link driver is finished processing the message, and the message in the queue will be picked up and serviced by one of the threads that is currently busy servicing another message. If in step 327 the link driver finds an idle thread, then in step 328 the link driver activates execution of the idle thread, and the link driver is finished processing the message. In this case, the activated idle thread will service the message that was just inserted into the collector queue.

Steps 312, 327 and 328 can be implemented using a call back mechanism. A callback function is registered by a pipe when the pipe is opened. When an idle server thread tries to pick up a reference to a pipe from the head of the collector queue and the queue is empty, the thread is blocked on a condition variable and can only be resumed when a signal is sent by the callback function to the condition variable. The callback function is invoked as soon as the pipe detects an incoming message. Invocation of the callback function sends a signal to the condition variable, causing resumption of one of any number of threads blocked on the condition variable.

In the network server 20 of FIG. 2, a respective collector queue is used in each data mover to queue all client messages received by the data mover. The collector queue is part of the communication stacks 74 in FIG. 5 residing between the network link drivers 72 assigned to the pipes or network links, and the code threads which are part of the file access protocols 75. The idle code threads are activated by the real-time scheduler in the kernel 63 in FIG. 5.

In view of the above, a network file server has been provided that uses an cached disk array for data storage and a plurality of data mover computers for servicing client file access requests and managing file system tasks such as maintenance of a file directory. The files stored in the cached disk array are accessible by the clients through more than one of the data mover computers so that the data movers are not a bottleneck to file access. The data mover computers perform the file system tasks such as mapping of file names to logical blocks and the locking and unlocking of the files in order to minimize loading on the cached disk array. Each of the data mover computers maintains a local cache of file directory information including locking information of locked files that are accessible through the data mover.

What is claimed is:

1. A file server for serving clients in a data network, said file server comprising:
    a cached disk storage subsystem including an array of disk drives and a semiconductor cache memory coupled to the disk drives for storage of data written to and read from the disk drives; and
    a plurality of data mover computers linking the cached disk storage subsystem to the data network for responding to a request for file access from a client in the data network by transferring data between the cached disk storage subsystem and the data network, wherein the cached disk storage subsystem stores read-write files which are shared among the clients and are each accessible by the clients through more than one of the data mover computers, and wherein the file server maintains a file directory accessible by the data mover computers in response to file access requests to determine whether or not file access for a client is permitted, to map file names to logical blocks of data that comprise the files and are stored in the cached disk storage subsystem, and to lock and unlock each of the read-write files for shared read-write access among the clients through more than one of the data mover computers, and
    wherein each data mover computer maintains a local cache of file directory information for locked files accessible by said each data mover computer, and wherein each data mover is computer programmed to respond to each request from a client serviced by said each data mover for access to a specified file by accessing the file directory to determine whether or not access to the specified file by said each client serviced by said each data mover computer is precluded by file access attributes of the specified file, and accessing the local cache of file directory information for locked files accessible by said each data mover computer to determine whether or not access to the specified file by said each client serviced by said each data mover computer is precluded by a lock on the specified file.

2. The file server as claimed in claim 1, wherein the local cache maintained by said each data mover computer includes an index of all locked files accessible by said each data mover computer.

3. The file server as claimed in claim 1, wherein the local cache maintained by said each data mover computer includes all file information affecting file access for all locked files accessible through said each data mover computer.

4. The file server as claimed in claim 3, wherein the local cache in said each data mover computer also includes a partial directory of file information for unlocked files.

5. The file server as claimed in claim 1, wherein said each data mover computer maintains a list of all locked portions of files accessible through said each data mover computer.

6. The file server as claimed in claim 1, wherein the file directory information in the local cache in said each data mover computer includes mapping information mapping file names to a list of logical blocks for each file name, file attributes that affect data access to each named file, and locking information down to a logical block level of granularity for each named file.

7. A file server for serving clients in a data network, said file server comprising:
    a cached disk storage subsystem including an array of disk drives and a semiconductor cache memory coupled to the disk drives for storage of data written to and read from the disk drives; and
    a plurality of data mover computers linking the cached disk storage subsystem to the data network for responding to a request for file access from a client in the data network by transferring data between the cached disk storage subsystem and the data network, wherein the cached disk storage subsystem stores read-write files which are shared among the clients and are each accessible by the clients through more than one of the data mover computers, and wherein the file server maintains a file directory accessible by the data mover computers in response to file access requests to determine whether or not file access for a client is permitted, to map file names to logical blocks of data that comprise the files and are stored in the cached disk storage subsystem, and to lock and unlock each of the read-write files for shared read-write access among the clients through more than one of the data mover computers, and
    wherein each data mover computer maintains a local cache of file directory information for locked files accessible by said each data mover computer, and wherein each data mover computer is programmed to respond to each request from a client serviced by said each data mover for access to a specified file by accessing the file directory to determine whether or not access to the specified file by said each client serviced by said each data mover computer is precluded by file access attributes of the specified file, and accessing the local cache of file directory information for locked files accessible by said each data mover computer to determine whether or not access to the specified file by said each client serviced by said each data mover computer is precluded by a lock on the specified file; and
    wherein the data mover computers are programmed to follow a cache consistency scheme to ensure that shared locking information is consistent in the local caches of the data mover computers.

8. The file server as claimed in claim 7, wherein the local cache maintained by said each data mover computer includes an index of all locked files accessible by said each data mover computer.

9. The file server as claimed in claim 7, wherein the local cache maintained by said each data mover computer includes all file information affecting file access for all locked files accessible through said each data mover computer.

10. The file server as claimed in claim 9, wherein the local cache in said each data mover computer also includes a partial directory of file information for unlocked files.

11. The file server as claimed in claim 7, wherein each data mover computer maintains a list of all locked portions of files accessible through said each data mover computer.

12. The file server as claimed in claim 7, wherein the file directory information in the local cache in said each data mover computer includes mapping information mapping file names to a list of logical blocks for each file name, file attributes that affect data access to each named file, and locking information down to a logical block level of granularity for each named file.

13. The file server as claimed in claim 12, wherein locking information for the files is not stored in the cached disk storage subsystem.

14. A file server for serving clients in a data network, said file server comprising:
   a cached disk storage subsystem including an array of disk drives and a semiconductor cache memory coupled to the disk drives for storage of data written to and read from the disk drives;
   a plurality of data mover computers linking the cached disk storage subsystem to the data network for responding to a request for file access from a client in the data network by transferring data between the cached disk storage subsystem and the data network; and
   at least one data link internal to the file server and interconnecting the data mover computers for passing messages among the data mover computers;
   wherein the cached disk storage subsystem stores read-write files which are shared among the clients and are each accessible by the clients through more than one of the data mover computers, and wherein the file server maintains a file directory accessible by the data mover computers in response to file access requests to determine whether or not file access for a client is permitted, to map file names to logical blocks of data that comprise the files and are stored in the cached disk storage subsystem, and to lock and unlock each of the read-write files for shared read-write access among the clients through more than one of the data mover computers, and
   wherein each data mover computer maintains a local cache of file directory information for locked files accessible by said each data mover computer, and wherein each data mover computer is programmed to respond to each request from a client serviced by said each data mover for access to a specified file by accessing the file directory to determine whether or not access to the specified file by said each client serviced by said each data mover computer is precluded by file access attributes of the specified file, and accessing the local cache of file directory information for locked files accessible by said each data mover computer to determine whether or not access to the specified file by said each client serviced by said each data mover computer is precluded by a lock on the specified file; and
   wherein the data mover computers are programmed to follow a cache consistency scheme to ensure that shared locking information is consistent in the local caches of the data mover computers, the cache consistency scheme passing messages over the data link among the data mover computers.

15. The file server as claimed in claim 14, wherein the local cache maintained by said each data mover computer includes an index of all locked files accessible by said each data mover computer.

16. The file server as claimed in claim 14, wherein the local cache maintained by said each data mover computer includes all file information affecting file access for all locked files accessible through said each data mover computer.

17. The file server as claimed in claim 16, wherein the local cache in each data mover computer also includes a partial directory of file information for unlocked files.

18. The file server as claimed in claim 14, wherein each data mover computer maintains a list of all locked portions of files accessible through said each data mover computer.

19. The file server as claimed in claim 14, wherein the file directory information in the local cache in said each data mover computer includes mapping information mapping file names to a list of logical blocks for each file name, file attributes that affect data access to each named file, and locking information down to a logical block level of granularity for each named file.

20. The file server as claimed in claim 19, wherein locking information for the files is not stored in the cached disk storage subsystem.

21. The file server as claimed in claim 14, wherein the messages include messages indicating grants of locks, and messages indicating releases of locks.

22. The file server as claimed in claim 21, wherein the messages further include messages indicating denials of locks.

23. The file server as claimed in claim 21, wherein the messages further include messages indicating changes to file attributes affecting file access.

24. The file server as claimed in claim 21, wherein the messages identify data mover ownership of locked files but do not identify client ownership of locked files.

25. The file server as claimed in claim 21, wherein the data mover computers are each programmed with a network file manager program for managing client ownership of files, and with a data mover file manager program for managing data mover computer ownership of files, and wherein the network file manager program manages communication with clients requesting file access, and the data mover file manager program manages communication of the messages among the data mover computers.

26. A file server for serving clients in a data network, said file server comprising:
   a cached disk storage subsystem including an array of disk drives and a semiconductor cache memory coupled to the disk drives for storage of data written to and read from the disk drives;
   a plurality of data mover computers linking the cached disk storage subsystem to the data network for responding to a request for file access from a client in the data network by transferring data between the cached disk storage subsystem and the data network; and
   at least one data link internal to the file server and interconnecting the data mover computers for passing messages among the data mover computers;
   wherein the cached disk storage subsystem stores read-write files which are shared among the clients and are each accessible by the clients through more than one of the data mover computers, and wherein the file server maintains a file directory accessible by the data mover computers in response to file access requests to determine whether or not file access for a client is permitted, to map file names to logical blocks of data that comprise the files and are stored in the cached disk storage subsystem, and to lock and unlock each of the read-write files for shared read-write access among the clients through more than one of the data mover computers, and
   wherein each data mover computer maintains a local cache of file directory information for locked files accessible by said each data mover computer, and wherein each data mover computer is programmed to respond to each request from a client serviced by said each data mover for access to a specified file by accessing the file directory information to determine whether or not access to the specified file by said each client serviced by said each data mover computer is precluded by file access attributes of the specified file, and accessing the local cache of file directory information for locked files accessible by said each data mover computer to determine whether or not access to the specified file by said each client serviced by said each data mover computer is precluded by a lock on the specified file;

wherein the data mover computers are programmed to follow a cache consistency scheme to ensure that shared locking information is consistent in the local caches of the data mover computers, the cache consistency scheme passing messages over the data link among the data mover computers;

wherein the file directory information in the local cache in said each data mover computer includes, for each locked file accessible through said each data mover computer, mapping information mapping file names to a list of logical blocks for each file name, file attributes that affect data access to each named file, and all locking information down to a logical block level of granularity for each named file; and wherein the messages include messages indicating grants of locks, messages indicating releases of locks, and messages indicating changes to file attributes affecting file access, and the messages indicating grants of locks identify data mover computer ownership of locked files but do not identify client ownership of locked files.

27. The file server as claimed in claim 26, wherein locking information for the files is not stored in the cached disk storage subsystem.

28. The file server as claimed in claim 26, wherein the messages further include messages indicating denials of locks.

29. The file server as claimed in claim 26, wherein the data mover computers are each programmed with a network file manager program for managing client ownership of files, and a data mover file manager for managing data mover computer ownership of files, and wherein the network file manager program manages communication with clients requesting file access, and the data mover file manager program manages communication of the messages among the data mover computers.

30. A method of operating a file server for serving clients in a data network, the file server including a cached disk storage subsystem and a plurality of data mover computers linking the cached disk storage subsystem to the data network for transfer of data between the cached disk storage subsystem and the data network, and the cached disk storage subsystem having an array of disk drives and a semiconductor cache memory for storing data written to and read from the array of disk drives, said method comprising the steps of:

(a) maintaining in each of the data mover computers a file directory of locked files accessible by the data mover computers in response to file access requests by the clients to determine whether or not file access by a client is permitted; the locked files including read-write files which are shared among the clients, wherein the read-write files are accessible by the clients through more than one of the data mover computers; the file directory in each of the data mover computers including file access information indicating whether or not file access is precluded by file access attributes of the files, and locking information indicating whether or not file access is precluded by locks on the files;

(b) one of the data mover computers receiving from one of the clients a request for file access to a specified file, said one of the data mover computers accessing the file directory to determine whether or not access to the specified file by said one of the clients is precluded by file access attributes of the specified file, and when access to the specified file by said one of the clients is not precluded by file access attributes of the specified file, accessing the file directory to determine whether or not access to the specified file by said one of the clients is precluded by a lock on the specified file, and when access to the specified file by said one of the clients is not precluded by a lock on the specified file, satisfying the request by transferring data between the cached disk storage subsystem and the data network.

31. The method as claimed in claim 30, wherein each data mover computer maintains in its local cache all file information affecting file access for all locked files accessible through said each data mover computer.

32. The method as claimed in claim 31, wherein each data mover computer retains in its local cache file information for unlocked files accessed through said each data mover computer until said each data mover computer needs memory for storing other information.

33. The method as claimed in claim 31, wherein each data mover computer maintains in its local cache, for each locked file accessible through said each data mover computer, mapping information mapping file names to a list of logical blocks for each file name, file attributes that affect data access to each named file, and locking information down to a logical block level of granularity for each named file.

34. A method of operating a file server for serving clients in a data network, the file server including a cached disk storage subsystem and a plurality of data mover computers linking the cached disk storage subsystem to the data network for transfer of data between the cached disk storage subsystem and the data network, and the cached disk storage subsystem having an array of disk drives and a semiconductor cache memory for storing data written to and read from the array of disk drives, said method comprising the steps of:

(a) maintaining in each of the data mover computers a file directory of locked files accessible by the data mover computers in response to file access requests by the clients to determine whether or not file access by a client is permitted; the locked files including read-write files which are shared among the clients, wherein the read-write files are accessible by the clients through more than one of the data mover computers; the file directory in each of the data mover computers including file access information indicating whether or not file access is precluded by file access attributes of the files, and locking information indicating whether or not file access is precluded by locks on the files;

(b) one of the data mover computers receiving from one of the clients a request for file access to a specified file, said one of the data mover computers accessing the file directory to determine whether or not access to the specified file by said one of the clients is precluded by file access attributes of the specified file, and when access to the specified file by said one of the clients is not precluded by file access attributes of the specified file, accessing the file directory to determine whether or not access to the specified file by said one of the clients is precluded by a lock on the specified file, and when access to the specified file by said one of the clients is not precluded by a lock on the specified file, satisfying the request by transferring data between the cached disk storage subsystem and the data network;

wherein the data mover computers employ a cache consistency scheme to ensure that shared locking information is consistent in the local caches of the data mover computers.

35. The method as claimed in claim 34, wherein each data mover computer maintains in its local cache all file information affecting file access for all locked files accessible through said each data mover computer.

36. The method as claimed in claim 34, wherein each data mover computer retains in its local cache file information for unlocked files accessed through said each data mover computer until said each data mover computer needs memory for storing other information.

37. The method as claimed in claim 34, wherein each data mover computer maintains in its local cache, for each locked file accessible through said each data mover computer, mapping information mapping file names to a list of logical blocks for each file name, file attributes that affect data access to each named file, and locking information down to a logical block level of granularity for each named file.

38. The method as claimed in claim 34, wherein the cached disk storage subsystem does not store any locking information for network files accessible through the data mover computers.

39. The method as claimed in claim 34, wherein the cache consistency scheme employs message passing among the data mover computers.

40. The method as claimed in claim 34, wherein the messages include messages indicating grants of locks, and messages indicating releases of locks.

41. The method as claimed in claim 39, wherein the messages further include messages indicating a denial of a request for access to a locked file.

42. The method as claimed in claim 41, wherein the messages indicating a denial of a request for access to a locked file are used to maintain a local wait list for each locked file when data mover computers are waiting for a lock to be released.

43. The method as claimed in claim 42, wherein a message indicating a denial of a request for access to a locked file is transmitted only when the data mover computer denying a client request would not already be a next data mover computer waiting for release of a lock on the locked file.

44. The method as claimed in claim 39, wherein the messages further include messages indicating changes to file attributes affecting file access.

45. The method as claimed in claim 39, wherein the messages identify data mover ownership of locked files but do not identify client ownership of locked files.

* * * * *